United States Patent
Yamamoto et al.

(10) Patent No.: US 11,418,883 B2
(45) Date of Patent: Aug. 16, 2022

(54) AUDIO INTERFACE APPARATUS AND RECORDING SYSTEM

(71) Applicant: YAMAHA CORPORATION, Hamamatsu (JP)

(72) Inventors: Takao Yamamoto, Hamamatsu (JP); Tatsutoshi Abe, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 17/201,264

(22) Filed: Mar. 15, 2021

(65) Prior Publication Data
US 2021/0297778 A1    Sep. 23, 2021

(30) Foreign Application Priority Data
Mar. 17, 2020 (JP) .............................. JP2020-045884

(51) Int. Cl.
  H04R 3/00 (2006.01)
  H04R 3/12 (2006.01)
  G06F 3/16 (2006.01)
  H04R 29/00 (2006.01)

(52) U.S. Cl.
  CPC .............. *H04R 3/12* (2013.01); *G06F 3/167* (2013.01); *H04R 29/001* (2013.01); *H04R 2420/07* (2013.01)

(58) Field of Classification Search
  CPC .......... H04R 3/00; H04R 29/001; H04R 3/12; H04R 2420/01; H04R 2420/03
  USPC ............................................. 381/59, 80, 119
  See application file for complete search history.

(56) References Cited

U.S. PATENT DOCUMENTS

| 7,346,595 B2* | 3/2008 | Aoyama | G05D 1/0221 707/999.005 |
| 9,514,723 B2* | 12/2016 | Silfvast | G10H 1/18 |
| 2013/0322654 A1* | 12/2013 | Okabayashi | H04R 27/00 381/119 |

FOREIGN PATENT DOCUMENTS

JP        H0738983 A        2/1995

* cited by examiner

*Primary Examiner* — Disler Paul
(74) *Attorney, Agent, or Firm* — Rossi, Kimms & McDowell LLP

(57) ABSTRACT

An audio interface apparatus includes a communication apparatus configured to receive first time-series sound data from a computing device, an input circuit including an input port configured to be coupled with a sound input apparatus, an output circuit including an output port configured to be coupled with a sound output apparatus, a memory, and a processor. The processor is configured to: store, in the memory, the first time-series sound data, to output, to the output circuit, the first time-series sound data stored in the memory, to acquire a second time-series sound data from the input circuit, to store, in the memory, the second time-series sound data, to generate an identifier for synchronizing the second time-series sound data with the first time-series sound data, and to transmit, to the computing device, the second time-series sound data and the identifier.

11 Claims, 14 Drawing Sheets

AUDIO INTERFACE APPARATUS AND RECORDING SYSTEM

CROSS REFERENCE TO RELATED APPLICATION

This application claims priority from Japanese Patent Application No. 2020-045884, filed Mar. 17, 2020, the entire contents of which are incorporated herein by reference.

BACKGROUND

Field of the Invention

The present invention relates to audio interface apparatuses, and relates to recording systems.

Description of Related Art

Audio interface apparatuses to be connected with Personal Computers (PCs) are known in the art.

Patent Document 1 (Japanese Patent No. 7-38983) discloses an audio interface apparatus that plays back accompaniment data acquired from a PC, and transmits sound data received by a microphone to the PC.

In the technique of Patent Document 1, unstable connection between the audio interface apparatus and the PC may cause delay of sound data in relation to accompaniment data. Synchronizing the accompaniment data with the sound data is one approach for eliminating time delays. However, each unique delay time cannot be determined because the delay time changes depending on connection status.

SUMMARY

In view of the circumstances described above, it is an object of the present disclosure to accurately synchronize accompaniment data with performance data, even if the connection between the audio interface apparatus and the PC is unstable.

To solve the above problem, an audio interface apparatus according to an aspect of the disclosure is an audio interface apparatus including: a communication apparatus configured to receive first time-series sound data from a computing device, the first time-series sound data representing sound of a first part of a piece of music and including a plurality of first data blocks obtained by sampling the sound of the first part; an input circuit including an input port configured to be coupled with a sound input apparatus; an output circuit including an output port configured to be coupled with a sound output apparatus; one or more memories; and a processor configured to implement instructions stored in the one or more memories, in which: the processor implements the instructions stored in the one or more memories to: store, in the one or more memories, the first time-series sound data received by the communication apparatus, output, to the output circuit, the first time-series sound data stored in the one or more memories, acquire second time-series sound data from the input circuit, the second time-series sound data representing sound of a second part of the piece of music received by the sound input apparatus and including a plurality of second data blocks obtained by sampling the second time-series sound data, store, in the one or more memories, the second time-series sound data, generate an identifier for synchronizing the second time-series sound data with the first time-series sound data, and transmit, to the computing device, the second time-series sound data and the identifier.

DESCRIPTION OF THE EMBODIMENTS

First Embodiment

Figure 1:
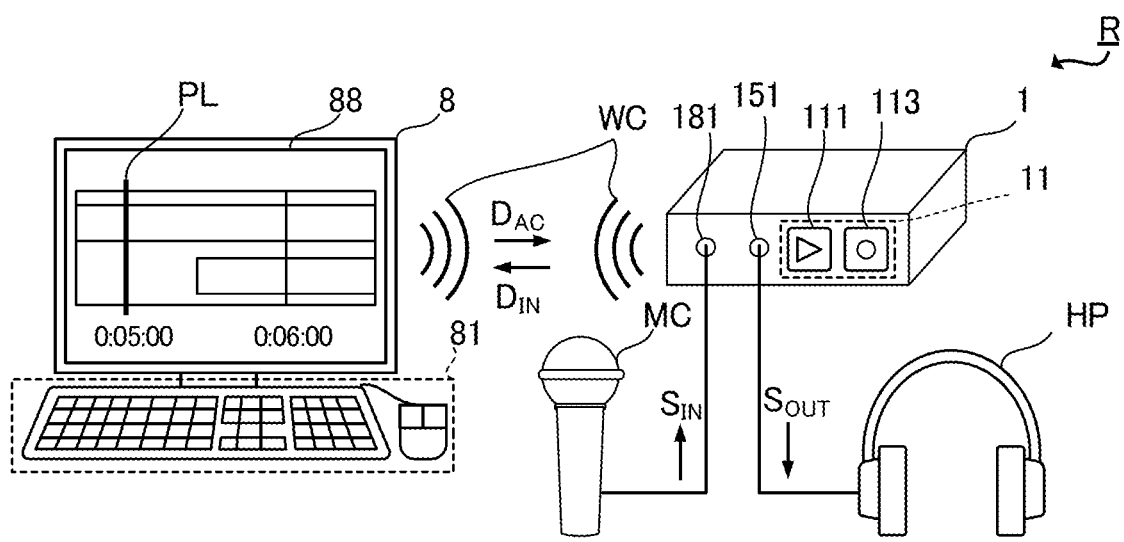
FIG. 1 shows appearance of a recording system R according to the first embodiment.

FIG. 1 shows the appearance of a recording system R according to the first embodiment. In the recording system R, sound generated by a user's performance (e.g., singing, playing an instrument) is recorded in conjunction with the accompaniment of a piece of music. The recording system R includes an audio interface apparatus 1, and a computing device 8. Examples of the computing device 8 include tablets and smartphones. The audio interface apparatus 1 and the computing device 8 are connected to each other by a wireless connection WC. Examples of the wireless connection WC include wireless Local Area Network (LAN) and Bluetooth (registered trademark).

The audio interface apparatus 1 will be described. The audio interface apparatus 1 controls the computing device 8 such that the computing device 8 records sound received by a microphone MC. The computing device 8 has time-series accompaniment data $D_{AC}$ that represents sound of the accompaniment part of the piece of music (referred to as "accompaniment sound"). The time-series accompaniment data $D_{AC}$ is transmitted to the audio interface apparatus 1.

A piece of music consists of an accompaniment part (an example of a "first part") and a user's performance part (an example of a "second part"). The performance part may consist of multiple types of parts (e.g., a piano part, a violin part). In this case, the time-series accompaniment data $D_{AC}$ may be data obtained by mixing of the sounds of the multiple types of parts. In the first embodiment, the time-series accompaniment data $D_{AC}$ is stored in the computing device 8. The time-series accompaniment data $D_{AC}$ may be generated by an external device. In this case, the computing device 8 may acquire the time-series accompaniment data $D_{AC}$ from the external device.

For simplicity, an example will be given in which the audio interface apparatus 1 and the computing device 8 are operated by the same user.

The audio interface apparatus 1 includes an operation panel 11, an output port 151 that receives a supply of an analog output signal $S_{OUT}$, and an input port 181 that receives a supply of an analog sound signal $S_{IN}$. In the example shown in FIG. 1, a headphone set HP (an example of a "sound output apparatus") is connected to the output port 151. A device other than the headphone set HP, for example, a speaker, may be connected to the output port 151.

In the example of FIG. 1, a microphone MC (an example of a "sound input apparatus") is connected to the input port 181. An electronic musical instrument (e.g., electronic string instrument and electronic organ) may be connected to the input port 181.

The headphone set HP and the microphone MC will be described below. A user wearing the headphone set HP plays the performance part while listening to the accompaniment sound. Specifically, an output signal $S_{OUT}$ is supplied to the headphone set HP from the audio interface apparatus 1, and the accompaniment sound based on the output signal $S_{OUT}$ is output from the headphone set HP. When the user's performance sound is received by the microphone MC, a sound signal $S_{IN}$ representative of the performance sound is output to the input port 181. The sound signal $S_{IN}$ is converted into digital time-series sound data $D_{IN}$ by the audio interface apparatus 1, and the time-series sound data $D_{IN}$ is transmitted to the computing device 8. When the microphone MC is used by the user, both the accompaniment sound and the performance sound are output from the headphone set HP. In this case, the output signal $S_{OUT}$ consists of signals representative of the accompaniment sound and the performance sound. This allows the user to perform while also allowing the user to confirm that the performance coincidences with the accompaniment. In contrast, when the microphone MC is not used by the user, only the accompaniment sound is output from the headphone set HP. In this case, the output signal $S_{OUT}$ consists only of the signal representative of the accompaniment sound.

The time-series accompaniment data $D_{AC}$ (example of "first time-series sound data") stored in the computing device 8 consists of a plurality of accompaniment data blocks (example of "first data blocks") $D_{AC}[1]$ to $D_{AC}[n]$, which is obtained by sampling the accompaniment sound at the sampling frequency $SP_{AC}$ (e.g., 44.1 kHz). The "n" refers to an integer greater than or equal to 1. Hereinafter, in some cases, an arbitrary accompaniment data block is denoted as $D_{AC}[x]$. The "x" refers to an integer greater than or equal to 1.

The time-series sound data $D_{IN}$ (example of "second time-series sound data") output from the audio interface apparatus 1 to the computing device 8 consists of a plurality of sound data blocks (an example of "second data blocks") $D_{IN}[1]$ to $D_{IN}[n]$, which is obtained by sampling the user's performance sound at the sampling frequency $SP_{IN}$ (e.g., 44.1 kHz). In some cases, an arbitrary sound data block is denoted as $D_{IN}[x]$.

For simplicity, description will be given in which the sampling frequency $SP_{AC}$ is identical to the sampling frequency $SP_{AC}$.

The operation panel 11 includes a playback button 111 and a record button 113, to receive user commands. Each press of the playback button 111 by the user switches between playback and stopping of the output signal $S_{OUT}$ (basically, the accompaniment sound and the performance sound). Each press of the record button 113 by the user switches between recording and stopping of the user's performance sound. The first press of the record button 113 causes the computing device 8 to record the user's performance sound received by the microphone MC. The next press of the record button 113 causes the computing device 8 to stop recording and to stop playback of the accompaniment sound (the sound represented by the output signal $S_{OUT}$).

At this time, playback of the accompaniment sound is not required to be stopped.

The computing device 8 will be described below. The computing device 8 includes input devices 81 and a display 88. The input devices 81 include a keyboard and a mouse. The display 88 consists of a liquid crystal display panel, and it displays images according to user commands. In the example shown in FIG. 1, the display 88 displays images generated by Digital Audio Workstation (DAW) software for recording, editing, mixing, and arranging process for digital sound signals. The DAW software allows display of, on the display 88, a point locator PL indicative of a start time point of the time-series accompaniment data $D_{AC}$. The start time point is a time in the time series. The position of the point locator PL is freely selectable. In the example shown in FIG. 1, the point locator PL indicates that the start time point is "0:05:00 (hours: minutes: seconds)".

Figure 2:
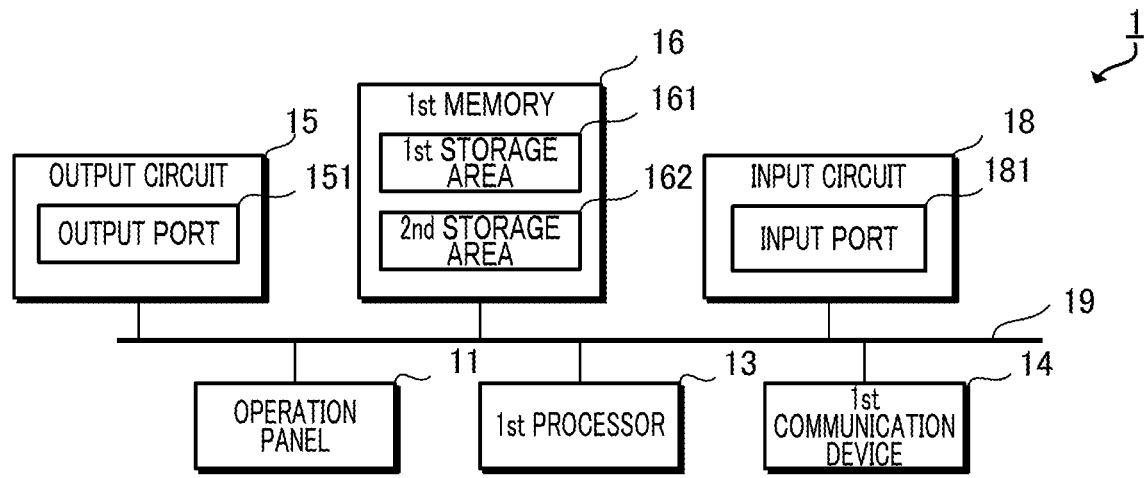
FIG. 2 is a block diagram of the audio interface apparatus 1.

FIG. 2 is a block diagram of the audio interface apparatus 1. In addition to the operation panel 11 shown in FIG. 1, the audio interface apparatus 1 includes a first processor 13, a first communication device 14, an output circuit 15 that includes an output port 151, a first memory 16, an input circuit 18 that includes an input port 181, and a bus 19.

The bus is connected to the operation panel 11, the first processor 13, the first communication device 14, the output circuit 15, the first memory 16, and the input circuit 18, so that they may access one another.

The first processor 13 may be a Central Processing Unit (CPU) or may be a Digital Signal Processor (DSP). The first processor 13 executes a program stored in the first memory 16, and controls each component of the audio interface apparatus 1.

The first communication device 14 communicates with the computing device 8 via a wireless connection WC. To achieve stable connection, the first communication device 14 communicates with the computing device 8 by use of so-called "handshake communication". In handshake communication, after transmission of data to the computing device 8, the first communication device 14 transmits the next data if an ACK signal is received from the computing device 8. Furthermore, the first communication device 14 transmits a retransmission request of data to the computing device 8 if an error occurs in the received data. For example, Transmission Control Protocol (TCP) is employed for handshake communication and retransmission requests.

The output circuit 15 outputs the output signal $S_{OUT}$ to the headphone set HP.

The first memory 16 holds the program executed by the first processor 13 and a variety of data used by the first processor 13. The first memory 16 is a so-called "ring buffer", in which, as a general concept, storage areas are arranged in a ring shape. For example, the first memory 16 is configured by a known recording medium, such as a magnetic recording medium, a semiconductor recording medium, or a combination of multiple types of recording mediums. Furthermore, the first memory 16 includes a first storage area 161 and a second storage area 162.

The first storage area 161 is an area for holding the time-series accompaniment data $D_{AC}$, and is accessed by the first processor 13. The first memory 16 further holds a read pointer and a write pointer. The read pointer is used to read an accompaniment data block $D_{AC}$ [X] from the first storage area 161. The write pointer is used to write an accompaniment data block $D_{AC}$ [X] to the first storage area 161. The initial values of the read and write pointers indicate, for example, the head address of the first storage area 161. The first processor 13 writes an accompaniment data block $D_{AC}$[x] to the address indicated by the write pointer, and updates the write pointer to the address at which the next accompaniment data block $D_{AC}$ [X] is written. If the write pointer reaches the address at the end of the first storage area 161, the first processor 13 updates the write pointer to the address at the head of the first storage area 161.

Description will be given in which an accompaniment data block $D_{AC}$ [X] is read out from the first storage area 161. The first processor 13 reads out the accompaniment data block $D_{AC}$ [X] which is written to the address indicated by the read pointer, and updates the read pointer to the address of the next accompaniment data block $D_{AC}$ [x+1]. If the read pointer reaches the address at the end of the first storage area 161, the first processor 13 updates the read pointer to the address at the head of the first storage area 161.

The second storage area 162 is an area for holding the time-series sound data $D_{IN}$, and is accessed by the first processor 13.

The input circuit 18 converts the analog sound signal $S_{IN}$ acquired from the microphone MC into digital time-series sound data $D_{IN}$.

Figure 3:
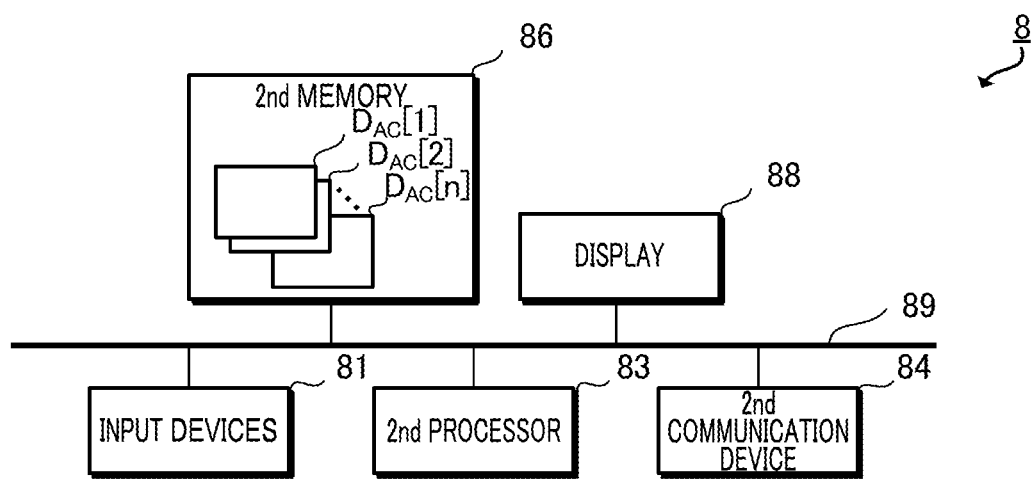
FIG. 3 shows a block diagram of the computing device 8.

FIG. 3 shows a block diagram of the computing device 8. In addition to the input devices 81 and display 88 shown in FIG. 1, the computing device 8 includes a second processor 83, a second communication device 84, and a second memory 86.

The bus 89 is connected to the input devices 81, the second processor 83, the second communication device 84, the second memory 86, and the display 88, so that they may access one another.

The second processor 83 may be a CPU or may be a DSP. The second processor 83 executes a program stored in the second memory 86, and controls each component of the computing device 8.

The second communication device 84 communicates with the audio interface apparatus 1 via a wireless connection WC.

The second memory 86 holds a program to be executed by the second processor 83 and variety of data used by the second processor 83. For example, the second memory 86 consists of a known recording medium, such as a magnetic recording medium, a semiconductor recording medium, or a combination of multiple types of recording mediums. The second memory 86 holds the time-series accompaniment data $D_{AC}$.

Figure 4:
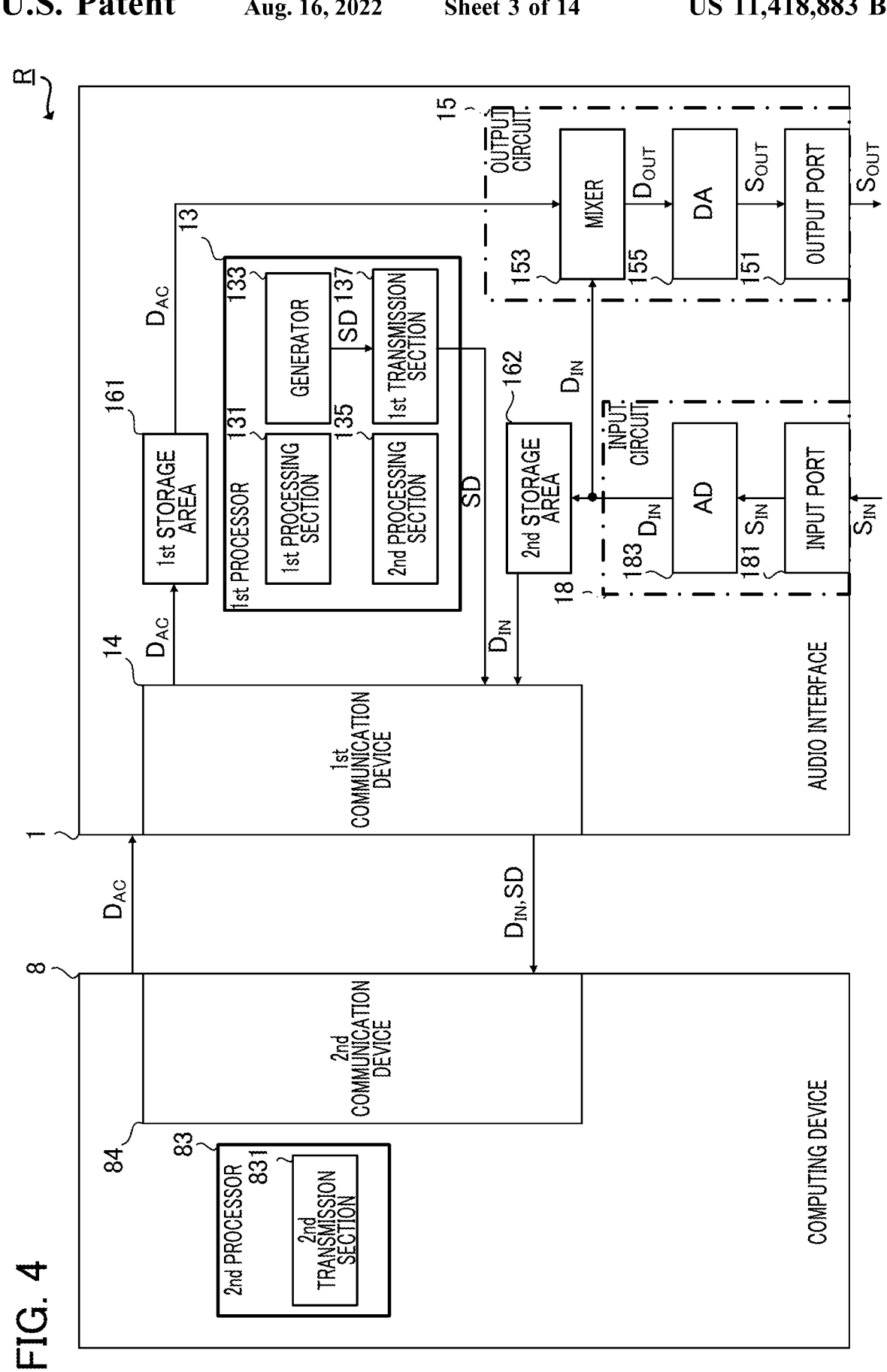
FIG. 4 shows the function of the recording system R.

FIG. 4 shows the function of the recording system R. First, the computing device 8 will be described. The second processor 83 acts as a second transmission section 831 by executing the program.

The recording system R has feature of playback of the accompaniment from the cueing position of the accompaniment to the point at which the given period of time has elapsed since the cueing position. Accordingly, prior to the user's command to play the accompaniment (before the playback button 111 is pressed), the second transmission section 831 (the computing device 8) transmits a part of the accompaniment data $D_{AC}$ (e.g., accompaniment data blocks corresponding to a period from 0:05:00 to 0:05:10) to the audio interface apparatus 1 by use of the second communication device 84. Here, the part of the accompaniment data $D_{AC}$ consists of accompaniment data blocks $D_{AC}$ that correspond to a period from the time point indicated by the point locator PL (i.e., the time point of playback of the accompaniment) to the time at which the given period has elapsed. In other words, before the playback button 111 is pressed, these accompaniment data blocks $D_{AC}$ are stored in the first memory 16 of the audio interface apparatus 1 in advance. However, an example case is assumed in which this processing is not repeated. This processing allows the audio interface apparatus 1 to play back the accompaniment immediately after the playback button 111 is pressed, without being affected by the wireless connection state.

The given period is determined by the maximum capacity of the first storage area 161 of the first memory 16. Specifically, the given period is obtained by multiplying the time length of the period according to the number $N_{AC}$ of the accompaniment data blocks $D_{AC}$ that can be stored in the first storage area 161 by a factor α. The given period can be calculated by use of the following formula (1). However, a case is assumed in which the first storage area 161 is empty.

The given period=α×the number of the accompaniment data blocks $D_{AC}$ that the first storage area 161 can store $N_{AC}$/the sampling frequency $SP_{AC}$    (1)

The coefficient α is a real number, and is greater than 0 and is less than or equal to 1 (0<α≤1). For example, if the number $N_{AC}$ of the accompaniment data block $D_{AC}$ is 88,200, and the sampling frequency $SP_{AC}$ is 44.1 kHz, the predetermined period will be 2× α seconds.

Next, the audio interface apparatus 1 will be described. The first processor 13 acts as the first processing section 131, the generator 133, the second processing section 135, and the first transmission section 137 by executing the program.

The first processing section 131 stores the time-series accompaniment data $D_{AC}$ received from the computing device 8 in the first storage area 161.

The output circuit 15 generates an output signal $S_{OUT}$ by use of the time-series accompaniment data $D_{AC}$ stored in the first storage area 161, and outputs the output signal $S_{OUT}$ to the headphone set HP (referred to as "output processing"). In more detail, the output circuit 15 includes a mixer 153 and a DA converter 155, in addition to the output port 151 shown in FIG. 1.

The mixer 153 mixes the accompaniment data block $D_{AC}$ [x] with the sound data block $D_{IN}$ [X], and outputs the sound data block $D_{OUT}$.

The DA converter 155 converts the digital sound data blocks $D_{OUT}$ into an analog output signal $S_{OUT}$, and outputs the output signal $S_{OUT}$ to the output port 151.

The input circuit 18 acquires sound data blocks $D_{IN}$ based on sound received by the microphone MC. In more detail, the input circuit 18 includes an AD converter 183 in addition to the input port 181 shown in FIG. 1.

The AD converter 183 receives the analog sound signal $S_{IN}$ from the input port 181, and converts the analog sound signal $S_{IN}$ to digital time-series sound data $D_{IN}$.

The generator 133 generates an identifier SD for synchronizing the time-series accompaniment data $D_{AC}$ with the time-series sound data $D_{IN}$. The identifier SD represents a temporal correspondence between the time-series accompaniment data $D_{AC}$ and the time-series sound data $D_{IN}$. The generator 133 generates the identifier SD according to the first mode or the identifier SD according to the second mode in accordance with the input operation of the playback button 111 and the record button 113.

If the record button 113 is pressed alone, the identifier SD according to the first mode is generated. The identifier SD indicates that an accompaniment-start-time point is identical to a performance-start-time point. Here, the accompaniment-start-time point refers to a time point on the time series that corresponds to the first accompaniment data block $D_{AC}[1]$ of the time-series accompaniment data $D_{AC}$. The performance-start-time point refers to a time point on the time series (a time point on the time axis) that corresponds to the first sound data block $D_{IN}[1]$ of the time-series sound data $D_{IN}$. Hereinafter, a time point on the time series that corresponds to the last accompaniment data block $D_{AC}[n]$ of the time-series accompaniment data $D_{AC}$ is referred to as an "accompaniment-end-time point". A time point on the time series that corresponds to the last sound data block $D_{IN}[n]$ of the time-series sound data $D_{IN}$ is referred to as a "sound-end-time point".

Figure 5:
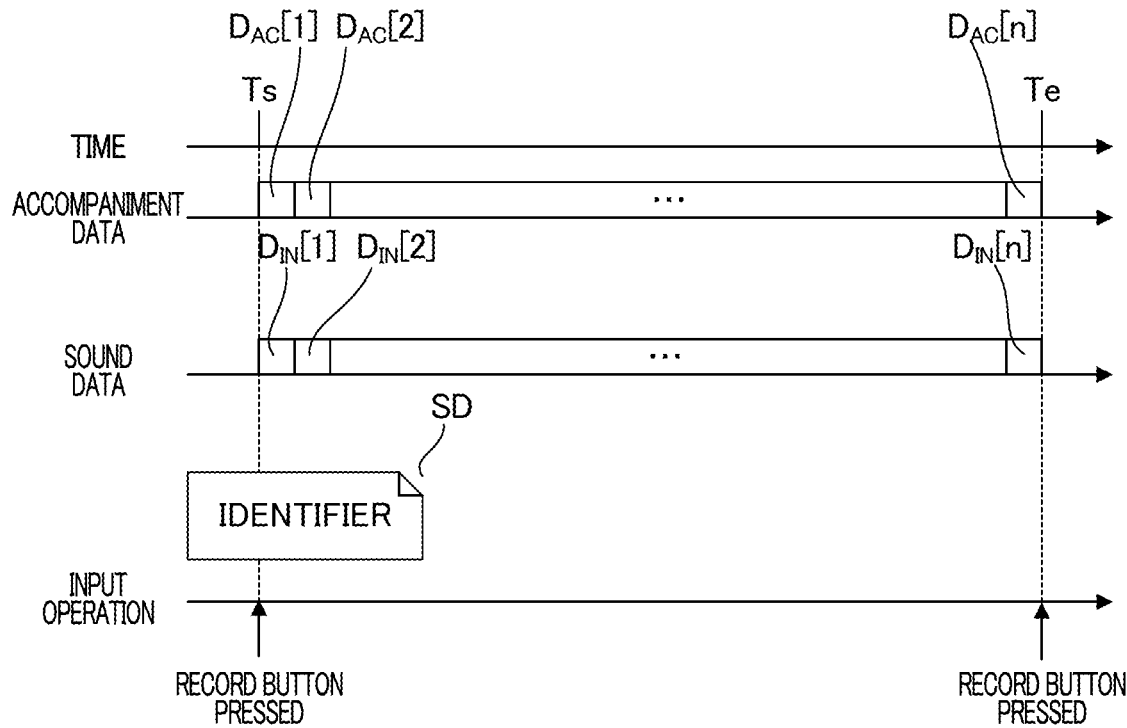
FIG. 5 shows an example of how the identifier SD according to the first mode is generated.

FIG. 5 shows an example of how the identifier SD according to the first mode is generated. In the example shown in FIG. 5, a case is assumed in which the accompaniment data blocks $D_{AC}[1]$ to $D_{AC}[n]$ are stored in the first storage area 161 at time Ts. The generator 133 generates the identifier SD according to the first mode if the record button 113 is pressed alone. In the example shown in FIG. 5, the record button 113 is pressed at time Ts, and the record button 113 is pressed again at time Te, which is later than time Ts. That is, the accompaniment-start-time time and the performance-start-time point are time Ts, and the accompaniment-end time point and the sound-end-time point is time Te.

Since the accompaniment-start-time point is identical to the performance-start-time point, the accompaniment data block corresponding to time Ts is $D_{AC}[1]$, and the sound data block corresponding to time Ts is $D_{IN}[1]$. Since the sampling frequency $SP_{IN}$ is identical to the sampling frequency $SP_{AC}$, the accompaniment data block corresponding to time Te is $D_{AC}[n]$, and the sound data block $D_{IN}$ corresponding to time Te is $D_{IN}[n]$.

The identifier SD according to the second mode indicates the elapsed time from the accompaniment-start-time point to the performance-start-time point.

Figure 6:
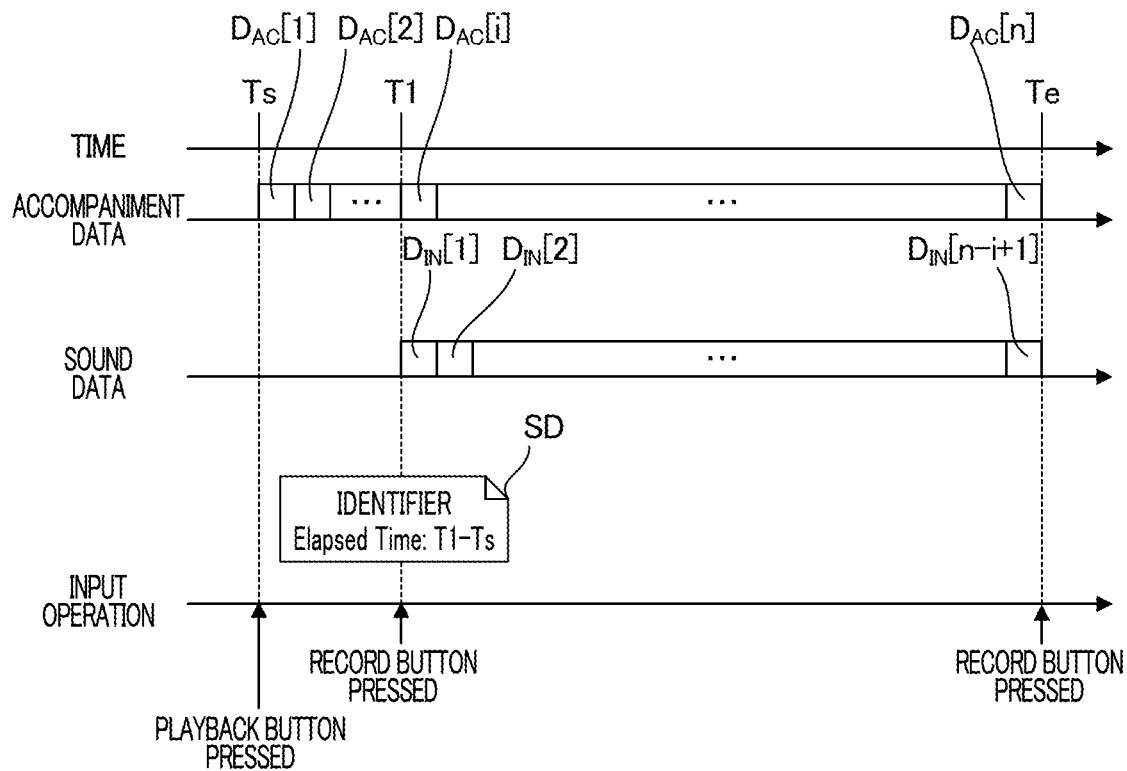
FIG. 6 shows an example of how the identifier SD according to the second mode is generated.

FIG. 6 shows an example of how the identifier SD according to the second mode is generated. In the example shown in FIG. 6, a case in assumed in which the accompaniment data blocks $D_{AC}[1]$ to $D_{AC}[n]$ are stored in the first storage area 161 at time Ts. The generator 133 generates the identifier SD in the second mode when the record button 113 is pressed after the pressing of the playback button 111. In the example shown in FIG. 6, the playback button 111 is pressed at time Ts, the record button 113 is pressed at time T1 (>Ts), and the record button 113 is pressed again at time Te (>T1). That is, the accompaniment-start-time point is at time Ts, the performance-start-time point is at the time T1, and the accompaniment-end-time point and the sound-end-time point is at the time Te. In the example shown in FIG. 6, the identifier SD indicates the elapsed time T1-Ts, which is defined by a time point between the accompaniment-start-time point (the time Ts) to the performance-start-time point (the time T1).

Since the user's performance has not been received by the microphone MC at the time Ts, there are no sound data block $D_{IN}$ corresponding to the time Ts. Therefore, the accompaniment data block corresponding to the time Ts is $D_{AC}[1]$, while the accompaniment data block corresponding to the time T1 is $D_{AC}[i]$. Here, the "i" refers to a value that satisfies the following formula (2).

$$i=(T1-Ts)\times\text{the sampling frequency } SP_{AC}+1 \quad (2)$$

The sound data block corresponding to the time T1 is $D_{IN}[1]$. The accompaniment data block $D_{AC}$ corresponding to the time Te is $D_{AC}[n]$. The sound data block corresponding to the time Te is $D_{IN}[n-i+1]$.

In addition to the elapsed time from the accompaniment-start-time point to the performance-start-time point, the identifier SD according to the second mode may indicate that the identifier SD is the second mode. When receiving the identifier SD, the computing device 8 determines whether the identifier SD indicates the first or the second mode.

Description of FIG. 4 will be given again. The second processing section 135 stores the time-series sound data $D_{IN}$ in the second storage area 162, and outputs the time-series sound data $D_{IN}$ stored in the second storage area 162 to the computing device 8. In more detail, the second processing section 135 stores a sound data block $D_{IN}[x]$ output from the AD converter 183 to the address indicated by the write pointer in the second storage area 162, and outputs the sound data block $D_{IN}[x]$ stored in the address indicated by the read pointer to the first transmission section 137.

The first transmission section 137 transmits, to the computing device 8, (i) the time-series sound data $D_{IN}$ output by the second processing section 135 and (ii) the identifier SD generated by the generator 133, by use of the first communication device 14. There are two timings for transmitting the time-series sound data $D_{IN}$ and the identifier SD, as shown below. The first timing is a timing after the recording ends. The second timing is a timing during the recording. In this description, the second timing is employed.

Figure 7A:
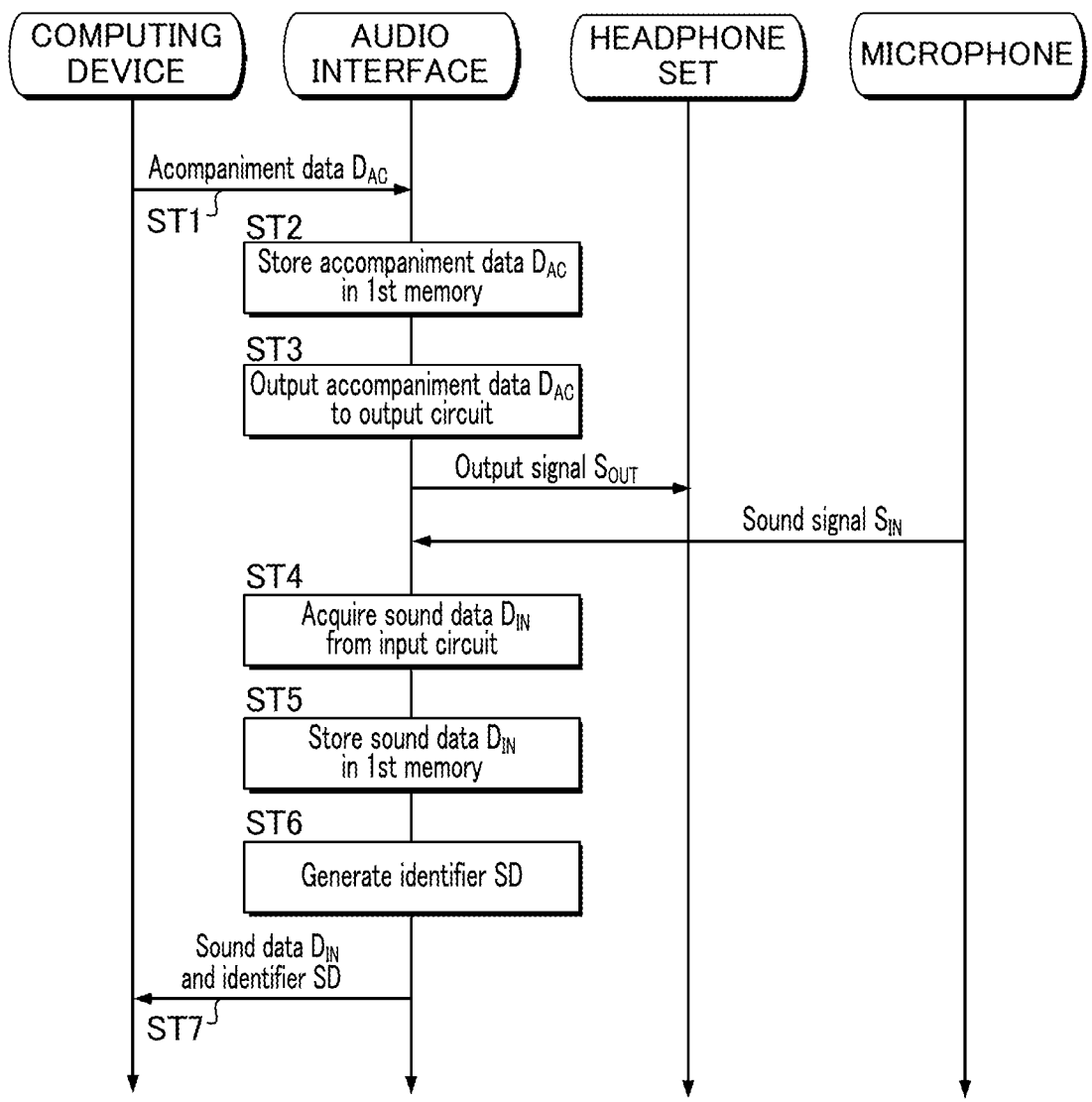
FIG. 7A is a sequence diagram that shows an overview of the recording system R.

FIG. 7A is a sequence diagram that shows an overview of the recording system R. The recording system R will be described focusing on the computing device 8. Next, the recording system R will be described focusing on the audio interface apparatus 1. The first communication device 14 receives time-series accompaniment data $D_{AC}$ from the computing device 8 (ST1). The first processor 13 stores the time-series accompaniment data $D_{AC}$ in the first memory 16 (ST2). Next, the first processor 13 outputs the time-series accompaniment data $D_{AC}$ stored in the first memory 16 to the output circuit 15 (ST3). The digital time-series accompaniment data $D_{AC}$ is converted into an analog output signal $S_{OUT}$ by the output circuit 15, and the output signal $S_{OUT}$ is output to the headphone set HP. The user's performance is then received by the microphone MC. The sound received by the microphone MC is input to the input circuit 18 as an analog sound signal $S_{IN}$. The analog sound signal $S_{IN}$ is converted into digital time-series sound data $D_{IN}$ by the input circuit 18. The first processor 13 acquires the time-series sound data $D_{IN}$ from the input circuit 18 (ST4), and generates an identifier SD (ST6). Then, the first processor 13 transmits the time-series sound data $D_{IN}$ together with the identifier SD to the computing device 8.

In a conventional recording system, there is no provision of a memory (buffer) in the audio interface apparatus. Even if a memory is provided in the audio interface apparatus, the memory is only for storing a program, and time-series sound data is not stored in the memory. That is, the time-series sound data is directly transmitted from the input circuit to the computing device. However, in the recording system R, the first memory 16 (the first and second storage areas 161 and 162) is provided in the audio interface apparatus 1, and the time-series sound data $D_{IN}$ is temporarily stored in the first memory 16. The time-series sound data $D_{IN}$ is then transmitted to the computing device 8 together with the identifier SD.

This allows the computing device 8 to synchronize, by use of the identifier SD, to the time-series accompaniment data $D_{AC}$ with the time-series sound data $D_{IN}$, even if the transmission of the time-series sound data $D_{IN}$ is delayed in relation to the time-series accompaniment data $D_{AC}$ due to unstable connection between the audio interface apparatus 1 and the computing device 8. As a result, temporal interruption of performance sound represented by the time-series sound data $D_{IN}$ is reduced.

Figure 7B:
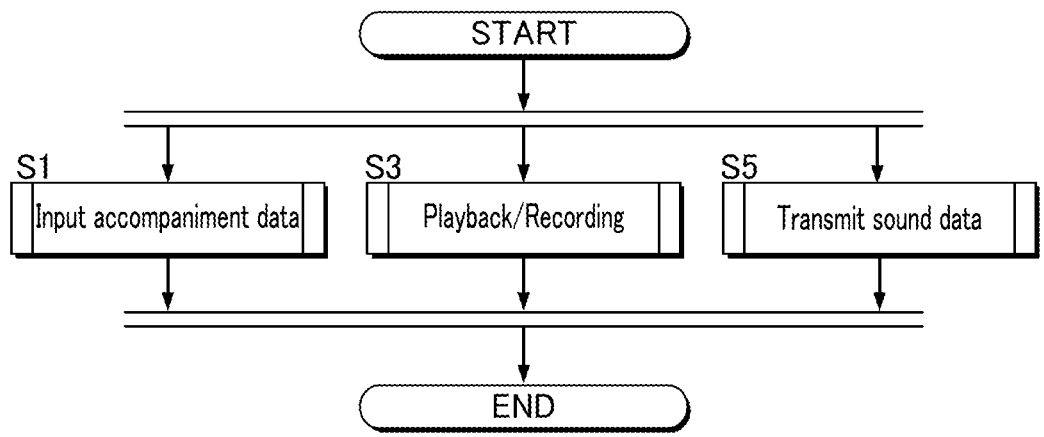
FIG. 7B is a flowchart showing the operation of the audio interface apparatus 1.

The operation of the audio interface apparatus 1 will be described with reference to FIG. 7B through FIG. 11. FIG. 7B is a flowchart showing the operation of the audio interface apparatus 1. The audio interface apparatus 1 executes three types of processing in parallel as follows.

(i) In step S1, the audio interface apparatus 1 receives time-series accompaniment data $D_{AC}$ from the computing device 8, and stores the time-series accompaniment data $D_{AC}$ in the first storage area 161.

(ii) In Step S3, process is carried out when the playback button 111 or the record button 113 is pressed.

(iii) In step S5, the audio interface apparatus 1 reads out the time-series sound data $D_{IN}$ from the second storage area 162, and transmits the time-series sound data $D_{IN}$ to the computing device 8.

Figure 8:
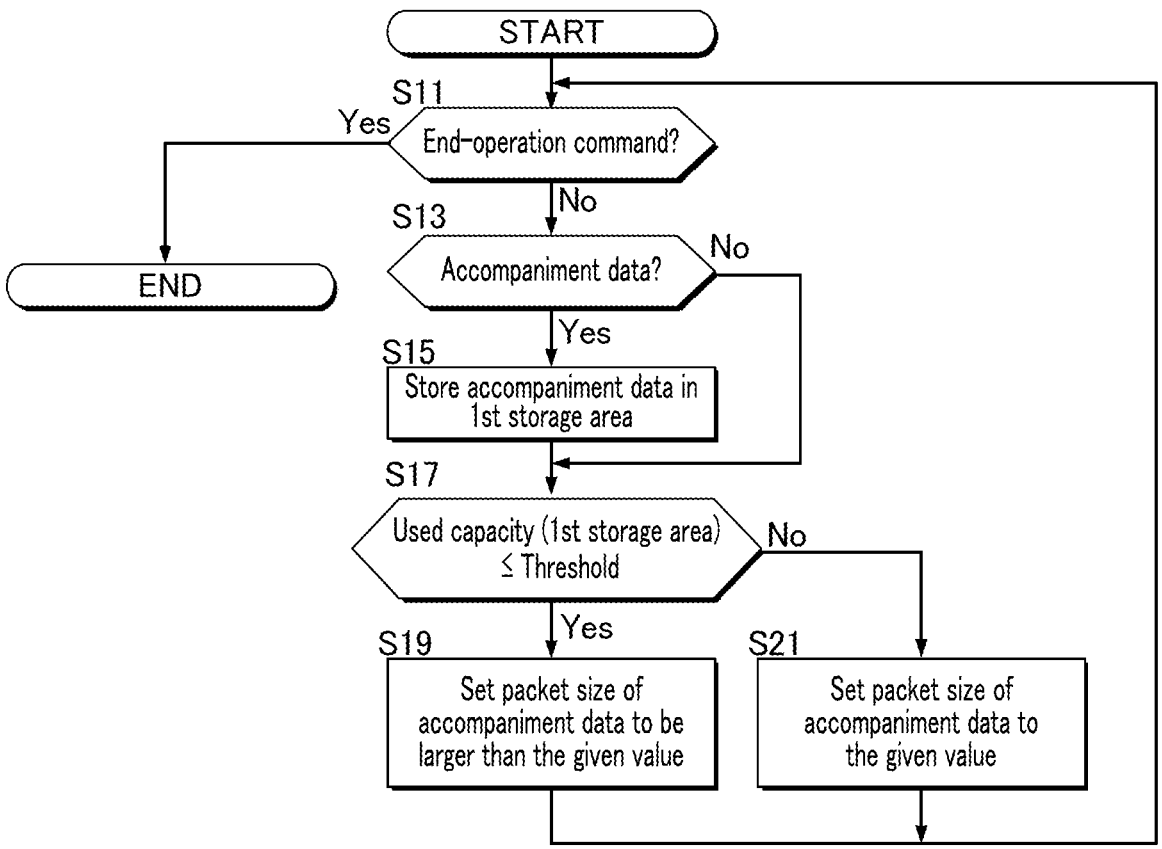
FIG. 8 is a detailed flowchart of step S1 shown in FIG. 7b.

FIG. 8 is a detailed flowchart of step S1 shown in FIG. 7b. The first processor 13 determines whether the end-operation command is received (S11). Specifically, the first processor 13 determines whether the power of the audio interface apparatus 1 is turned off (S11). If positive (Yes) in step S11, the first processor 13 ends all the processes shown in FIG. 8.

If negative (No) in step S11, the first processing section 131 (the first processor 13) determines whether the time-series accompaniment data $D_{AC}$ has been received from the computing device 8 (S13). If positive (Yes) in step S13, the first processing section 131 stores the received time-series accompaniment data $D_{AC}$ in the first storage area 161 (S15). If negative (No) in step S13, the first processor 13 moves the processing to step S17. In step S17, the first processing section 131 determines whether used capacity of the first storage area 161 is a threshold or less. The threshold in step S17 is greater than zero and is less than the storage capacity of the first storage area 161.

If the write pointer of the first storage area 161 is the read pointer of the first storage area 161 or greater, the used capacity of the first storage area 161 is obtained by the following formula (3). Otherwise, the used capacity of the first storage area 161 is obtained by the following formula (4).

Used capacity of the first storage area 161=Write pointer of the first storage area 161−Read pointer of the first storage area 161 (3)

Used capacity of the first storage area 161=The storage capacity of the first storage area 161+Write pointer of the first storage area 161−read pointer of the first storage area 161 (4)

If positive (Yes) in step S17, that is, if the time-series accompaniment data $D_{AC}$ which has not been played back yet is relatively smaller, the first processing section 131 instructs the computing device 8 to set the packet size for transmitting the time-series accompaniment data $D_{AC}$ to be larger than a given value (S19). The given value in step S19 is determined by the designer of the computing device 8. In general, the larger packet size makes the transfer rate faster. Accordingly, if the time-series accompaniment data $D_{AC}$ which has not been played back yet is relatively smaller, increasing the packet size prevents occurrence of a situation in which accompaniment cannot be played back due to the existence of such data $D_{AC}$ which has not been played back yet.

In contrast, if negative (No) in step S17, the first processing section 131 instructs the computing device 8 to set the packet size for transmitting the time-series accompaniment data $D_{AC}$ to a given value (S21). The given value in step S21 is identical to that in step S19. If the packet size has not been changed, step S21 may be omitted.

After step S19 or step S21 ends, the first processor 13 executes step S11 again.

Figure 9:
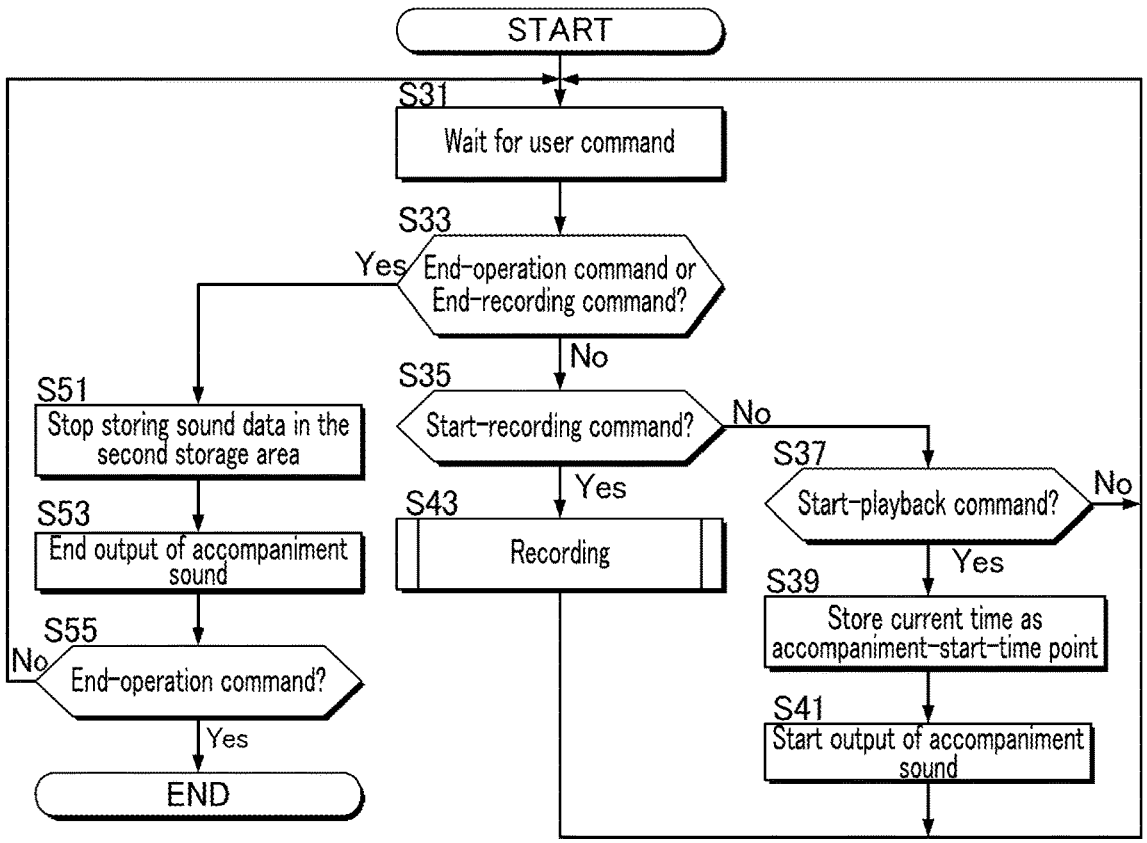
FIG. 9 is a detailed flowchart of step S3 shown in FIG. 7b.

FIG. 9 is a detailed flowchart of step S3 shown in FIG. 7b. In step S31, the first processor 13 waits for a user command for a certain period of time. Here, examples of user commands include (1) a command to turn off the power, (2) a command to start playback when the playback button 111 is pressed (a start-playback command), (3) a command to start recording when the record button 113 is pressed (a start-recording command), and (4) a command to stop recording when the record button 113 is pressed again (an end-recording command) Detailed description will be omitted, and the examples of the user commands may further include a command to end playback when the playback button 111 is pressed again (an end-playback command) If neither recording nor playback is carried out, the generator 133 does not generate the identifier SD. If recording is in progress, the generator 133 does not receive the end-playback command.

If the use command is received, or if the certain period has elapsed without receiving the user command, the first processor 13 determines whether the end-operation command or the end-recording command is received (S33). If negative (No) in step S33, the first processor 13 determines whether the start-recording command has been received (S35). If negative (No) in step S35, the first processor 13 determines whether the start-playback command has been received (S37). If positive (Yes) in step S37, the first processor 13 stores the current time in the first memory 16 as the accompaniment-start-time point (S39). Next, in step S41, the output circuit 15 starts the output process, which indicates the processing of outputting the output signal $S_{OUT}$ (basically, accompaniment sound) to the headphone set HP, according to the commands from the first processor 13.

After the end of step S41, or in a case of negative (No) in step S37, the first processor 13 executes step S31 again.

If positive (Yes) in step S35, the first processor 13 causes the computing device 8 to start recording.

Figure 10:
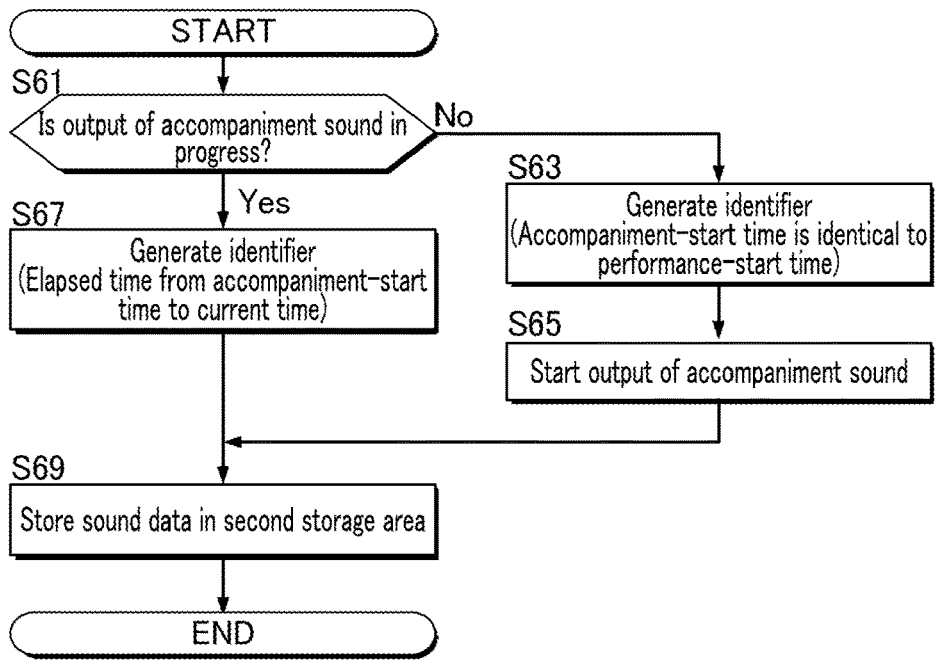
FIG. 10 is a detailed flowchart of step S43 (recording) shown in FIG. 7B.

FIG. 10 is a detailed flowchart of step S43 (recording) shown in FIG. 7B. The first processor 13 determines whether the output process carried out by the output circuit 15 is in progress (S61). If negative (No) in step S61, the generator 133 generates an identifier SD according to the first mode, which represents that the accompaniment-start-time point is identical to the performance-start-time point (S63). Next, the output circuit 15 starts the output processing (S65).

In contrast if positive (Yes) in step S61, the first processor 13 generates an identifier SD according to the second mode, which represents the elapsed time from the accompanimentstart-time point to the current time (S67). The accompaniment-start-time point has a value stored in the first memory 16 in step S39.

After the end of step S65 or after the end of step S67, the second processing section 135 starts to store the time-series sound data $D_{IN}$ in the second storage area 162 (S69). After the end of step S69, the first processor 13 ends the series of processing shown in FIG. 10, returns to the caller of step S43 (recording), and then executes step S31 again.

Description of FIG. 9 will be given again. If positive (Yes) in step S33, the second processing section 135 stops storing the time-series sound data $D_{IN}$ in the second storage area 162 in step S51. Next, the output circuit 15 ends the output processing for outputting accompaniment sound (S53). Then, the first processor 13 determines whether the end-operation command is received (S55). If negative (No) in step S55, the first processor 13 executes step S31 again. If positive (Yes) in step S55, the first processor 13 ends the series of process shown in FIG. 9.

Figure 11:
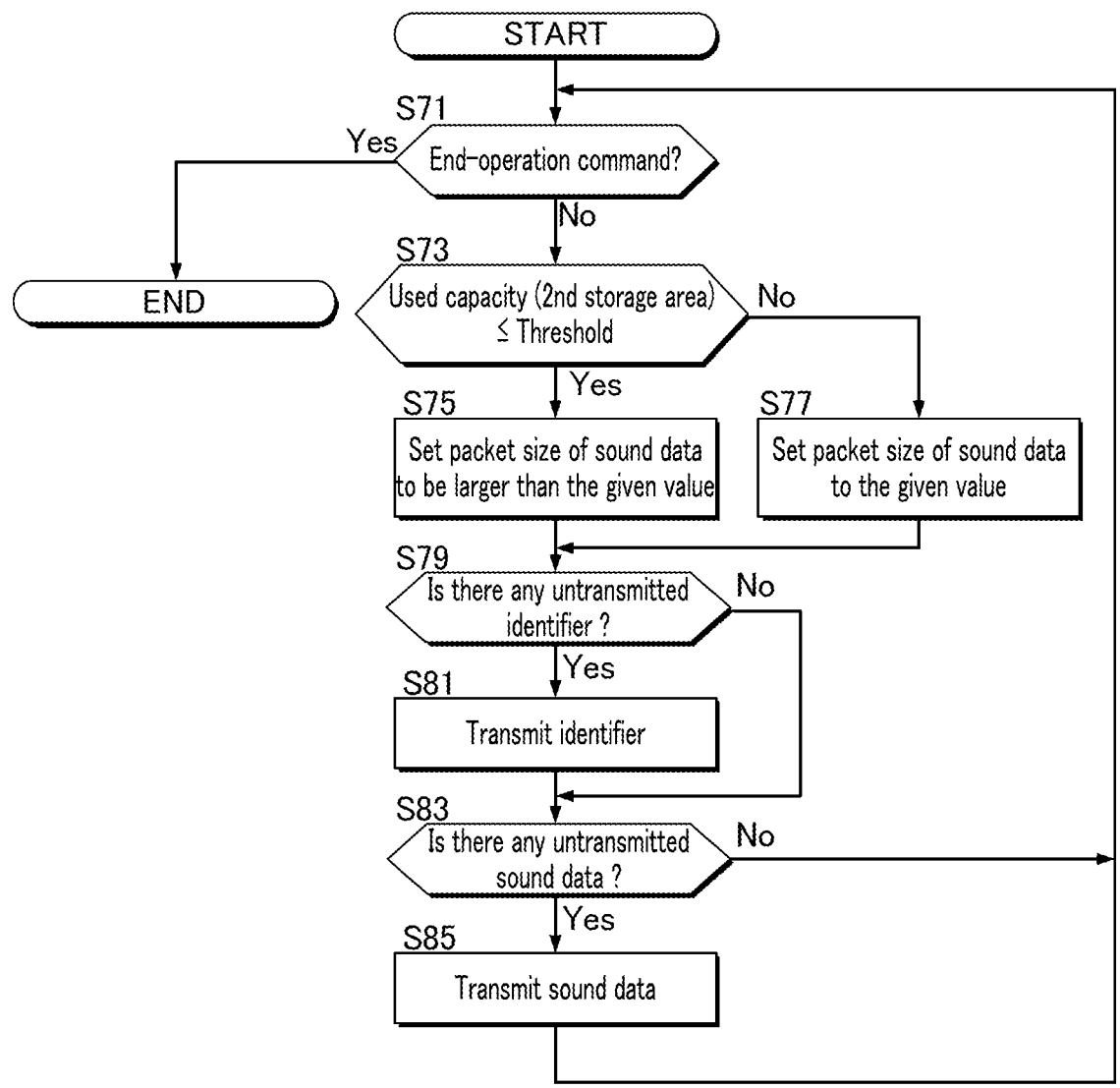
FIG. 11 is a detailed flowchart of step S5 shown in FIG. 7B.

FIG. 11 is a detailed flowchart of step S5 shown in FIG. 7B. The first processor 13 determines whether the end-operation command has been received (S71). If positive (Yes) in step S71, the first processor 13 ends the series of processes shown in FIG. 11. If negative (No) in step S71, the first transmission section 137 determines whether the free space of the second storage area 162 is less than the threshold (S73).

If the read pointer of the second storage area 162 is the write pointer of the second storage area 162 or greater, the free space of the second storage area 162 is obtained by the following formula (5). Otherwise, the free space of the second storage area 162 is obtained by the following formula (6). The threshold in step S73 has a value greater than zero and is less than the capacity of the second storage area 162.

Free space of the second storage area 162=Read pointer of the second storage area 162−Write pointer of the second storage area 162   (5)

Free space of the second storage area 162=Capacity of the second storage area 162+Read pointer of the second storage area 162−Write pointer of the second storage area 162   (6)

If the free space of the second storage area 162 is less than the threshold (S73: Yes), the first transmission section 137 sets a packet size for transmitting the sound data block $D_{IN}[x]$ to be larger than the given value (S75). The given value in step S75 is defined by the designer of the audio interface apparatus 1. In the foregoing description, the larger packet size makes the transfer rate faster. Accordingly, if the free space of the second storage area 162 is relatively smaller, increasing the packet size for transmitting the sound data block $D_{IN}[x]$ prevents occurrence of a situation in which one or more sound data blocks $D_{IN}[x]$ cannot be stored in the second storage area 162 due to increase of the free space of the second storage area 162.

In contrast, if the free space of the second storage area 162 is larger than the threshold (S73: No), the first transmission section 137 sets the packet size for transmitting the sound data block $D_{IN}[x]$ to a given value (S77). The given value in step S77 is identical to that in step S75. If the packet size has not been changed, step S77 may be omitted.

After the end of step S75 or after the end of step S77, the first transmission section 137 determines whether there is an identifier SD that has not been transmitted yet (S79). If positive (Yes) in step S79, the first transmission section 137 transmits the identifier SD to the computing device 8 by use of the first communication device 14 (S81).

After the end of step S81, or in a case of being negative (No) in step S79, the first transmission section 137 determines whether any sound data block $D_{IN}[x]$ that has not been transmitted yet remains (S83). If positive (Yes) in step S83, the second processing section 135 outputs the sound data block $D_{IN}[x]$ stored in the second storage area 162. The first transmission section 137 transmits the output of the sound data block $D_{IN}[x]$ to the computing device 8 (S85). After the end of step S85, or in a case of negative (No) in step S83, the first processor 13 executes step S71 again.

If the processing of steps S1 to S3 shown in FIG. 7B ends, the audio interface apparatus 1 ends the entire processing shown in FIGS. 8 to 11.

In the foregoing description, in the first embodiment, the time-series sound data $D_{IN}$ (the sound data blocks $D_{IN}[x]$) is temporarily stored in the second storage area 162. The time-series sound data $D_{IN}$ is then transmitted to the computing device 8 together with the identifier SD.

This allows the computing device 8 to synchronize, by use of the identifier SD, to the time-series accompaniment data $D_{AC}$ with the time-series sound data $D_{IN}$, even if the transmission of the time-series sound data $D_{IN}$ is delayed in relation to the time-series accompaniment data $D_{AC}$ due to unstable connection between the audio interface apparatus 1 and the computing device 8. As a result, temporal interruption of performance sound represented by the time-series sound data $D_{IN}$ is reduced.

In the first embodiment, the first transmission section 137 transmits the time-series sound data $D_{IN}$ and the identifier SD to the computing device 8 by wireless connection. The wireless connection is more unstable than the wired connection. For example, in wireless connection, in some cases, the transmission of the time-series sound data $D_{IN}$ is delayed due to interference caused by noise.

However, in the first embodiment, the time-series sound data $D_{IN}$ is temporarily stored in the second storage area 162. Even if the transmission of the time-series sound data $D_{IN}$ is delayed due to the wireless connection, performance sound represented by the time-series sound data $D_{IN}$ is reduced.

In the first embodiment, the generator 133 generates an identifier SD according to the first mode. The computing device 8 refers to such identifier SD to align the head of the time-series accompaniment data $D_{AC}$ with the head of the time-series sound data $D_{IN}$.

This allows for accurate synchronization between the time-series accompaniment data $D_{AC}$ and the time-series sound data $D_{IN}$. In the example shown in FIG. 5, the computing device 8 defines that the performance sound represented by a sound data block $D_{IN}[j]$ has been received by the microphone MC at a time at which the accompaniment sound represented by an accompaniment data block $D_{AC}[j]$ has been output ("j" is an integer from 1 to n). This allows for accurate synchronization between the time-series accompaniment data $D_{AC}$ and the time-series sound data $D_{IN}$.

In the first embodiment, the generator 133 generates an identifier SD according to the second mode. The computing device 8 aligns the next accompaniment data block $D_{AC}$ with the next sound data block $D_{IN}$, referring to the identifier SD according to the second mode. Here, the accompaniment data block $D_{AC}$ refers to a data block between two time points on the time series, one of which is an accompaniment-start-time point that correspond to the head of the accompaniment data block $D_{AC}$, and the other of which is a time point at which a time indicated by the identifier SD has elapsed from the accompaniment-start-time point time. The sound data block $D_{IN}$ is a data block that is positioned at the head of the time-series sound data $D_{IN}$.

This allows for accurate synchronization between the time-series accompaniment data $D_{AC}$ and the time-series sound data $D_{IN}$. In the example shown in FIG. 6, the computing device 8 defines that the performance sound represented by a sound data block $D_{IN}$ [j−i+1] has been received at the time the accompaniment sound represented by an accompaniment data block $D_{AC}$ [j] has been output. This allows for accurate synchronization between the time-series accompaniment data $D_{AC}$ and the time-series sound data $D_{IN}$.

In the first embodiment, the output circuit 15 includes the mixer 153. The mixer 153 mixes an accompaniment data block $D_{AC}$[x] with a sound data block $D_{IN}$[x]. This allows for the user to listen to the user's own performance sound while listening to the accompaniment sound, and therefore, to confirm that the user's own performance matches the accompaniment.

In the first embodiment, the second transmission section 831 transmits, to the audio interface apparatus 1 by use of the second communication device 84, an accompaniment data block $D_{AC}$ at time at which the given period of time has elapsed from the accompaniment data block $D_{AC}$ indicated by the point locator PL. The audio interface apparatus 1 transmits the time-series accompaniment data $D_{AC}$ to the audio interface apparatus 1 prior to a pressing of the playback button 111, so that the audio interface apparatus 1 can play back the accompaniment immediately after the playback button 111 is pressed.

In the first embodiment, the sounds of multiple types of accompaniment parts are mixed by the computing device 8. Therefore, the first embodiment can be applied to the multiple types of accompaniment parts.

Second Embodiment

In the first embodiment, an identifier SD represents the relationship between the accompaniment-start-time point and the performance-start-time point. In the second embodiment, an identifier SD is generated for each sound data block $D_{IN}$[x]. Each identifier SD indicates the relationship between the accompaniment-start-time point and the corresponding sound data block $D_{IN}$. The same reference signs will be used for the same components or functions in the first embodiment.

Figure 12:
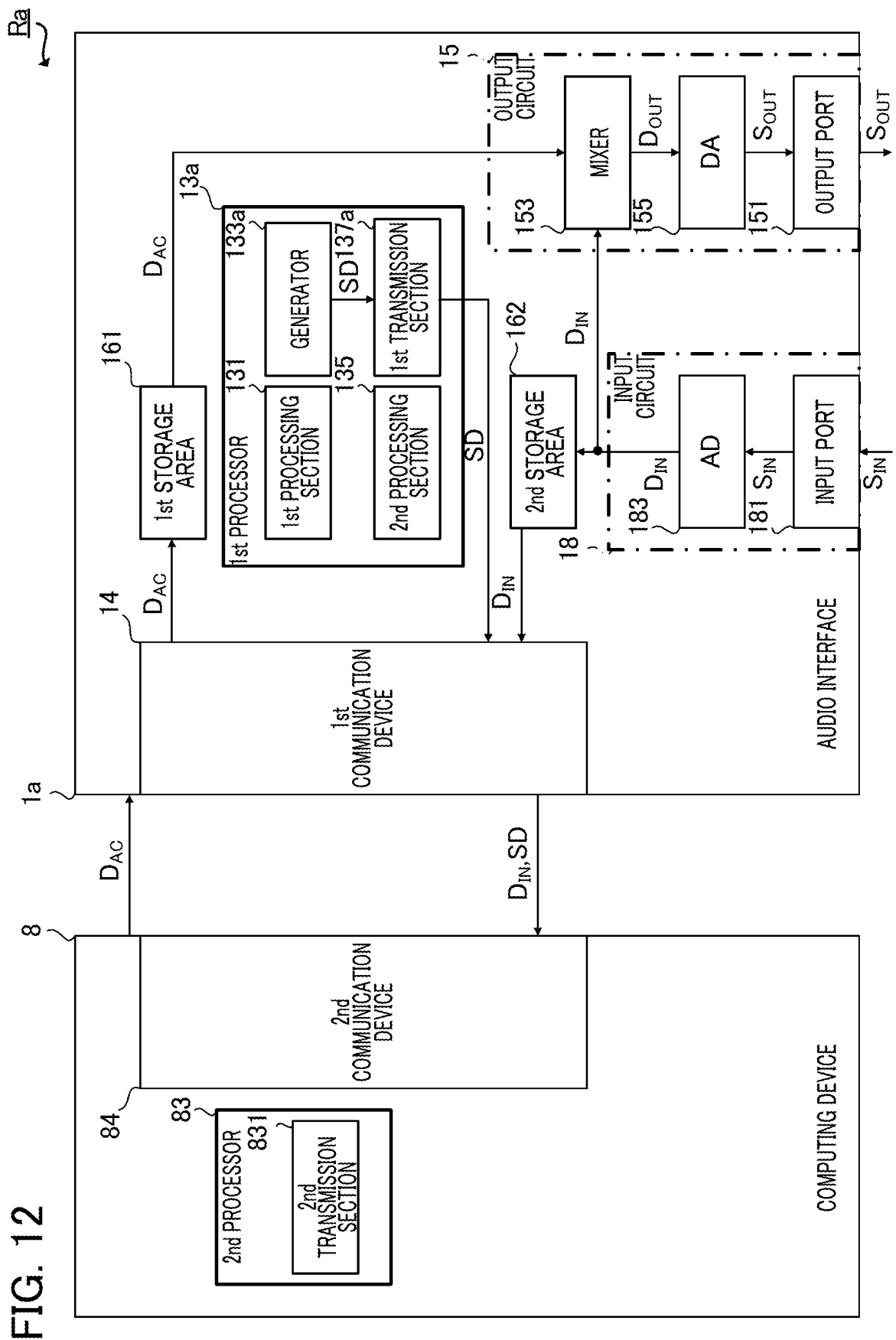
FIG. 12 shows function of the recording system Ra in the second embodiment.

FIG. 12 shows function of the recording system Ra in the second embodiment. The first processor 13a included in the audio interface apparatus 1a acts as a first processing section 131, a generator 133a, a second processing section 135, and a first transmission section 137a, by executing a program.

The generator 133a may generate (i) an identifier SD that corresponds to each of all sound data blocks $D_{IN}$, or may generate (ii) an identifier SD that corresponds to only each of some sound data blocks $D_{IN}$. That is, the generator 133a generates an identifier SD that corresponds to each of a plurality of sound data blocks $D_{IN}$. In this regard, both the case of (i) and (ii) are the same. The case (ii) will be described below.

The generator 133a generates an identifier SD that corresponds to a sound data block $D_{IN}$[1] at the time (referred to as Ta1) the performance starts. In addition, the generator 133a generates an identifier SD for each of some sound data blocks $D_{IN}$[k], which are obtained at time at which the given period has elapsed from the time Ta1. Each identifier SD indicates the elapsed time from a time point at which the accompaniment starts to a time point that corresponds to a sound data block $D_{IN}$[k] corresponding to the identifier.

Figure 13:
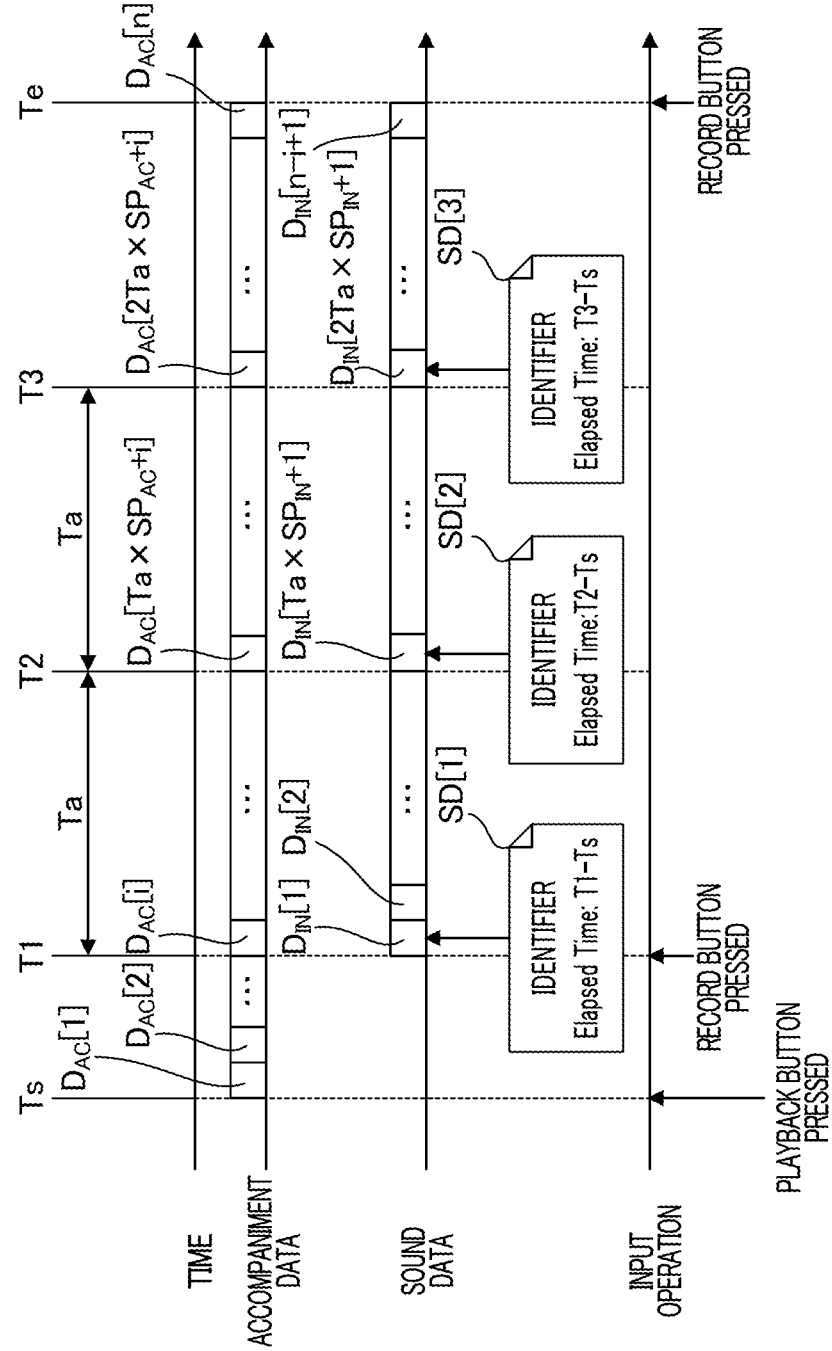
FIG. 13 shows an example of how identifiers SD according to the second embodiment are generated.

FIG. 13 shows an example of how identifiers SD according to the second embodiment are generated. In FIG. 13, an example case will be described in which the record button 113 is pressed after the pressing of the playback button 111. In the example in FIG. 13, the playback button 111 is pressed at time Ts, the record button 113 is pressed at time T1 (>Ts), and the record button 113 is pressed again at time Te (T1). The time at which the given period Ta elapses from time T1 is time T2. The time at which the given period Ta elapses from time T2 is time T3, which is the time before time Te.

In the example shown in FIG. 13, the generator 133a generates the identifier SD[1] at time T1, which is the time point at which the microphone MC starts to receive sound. In a similar manner, the generator 133a generates the identifier SD[2] at time T2, and generates the identifier SD[3] at time T3. The identifier SD[1] corresponds to the sound data block $D_{IN}$[1], and indicates the elapsed time T1-Ts, which is defined by the period from time Ts to time T1.

The identifier SD [2] corresponds to a sound data block $D_{IN}$ [Ta×$SP_{IN}$+1]. The accompaniment data block played back at time T2 is $D_{AC}$ [Ta×$SP_{AC}$+i]. The identifier SD [2] indicates the elapsed time T2-Ts, which is defined by the period from time Ts to time T2.

The identifier SD[3] corresponds to the sound data block $D_{IN}$[2Ta×$SP_{IN}$+1]. The accompaniment data block played back at time T3 is $D_{AC}$ [2Ta×$SP_{AC}$+i]. The identifier SD [3] indicates the elapsed time T3-Ts, which is defined by the period from time Ts to time T3.

Description of FIG. 12 will be given again. The first transmission section 137a associates an identifier SD[x] generated by the generator 133 with the corresponding sound data block $D_{IN}$[x], and transmits the identifier SD[x] and the sound data block $D_{IN}$[x] to the computing device 8. There are two methods of associating the identifier SD with the corresponding sound data block $D_{IN}$[x] as follows.

In the first method, a value indicative of the number of samples of the sound data block $D_{IN}$[x] corresponding to the identifier SD is added to the identifier SD. For example, the generator 133a adds "1", which indicates the number of samples of the sound data block $D_{IN}$[1], to the identifier SD[1].

In the second method, the first transmission section 137a transmits (i) the identifier SD[x] and (ii) the sound data block $D_{IN}$[x] corresponding to the identifier SD[x] in series. The first transmission section 137a may transmit the sound data block $D_{IN}$[x] after transmitting the identifier SD[x], or vice versa.

In the following, the first method will be applied.

Figure 14:
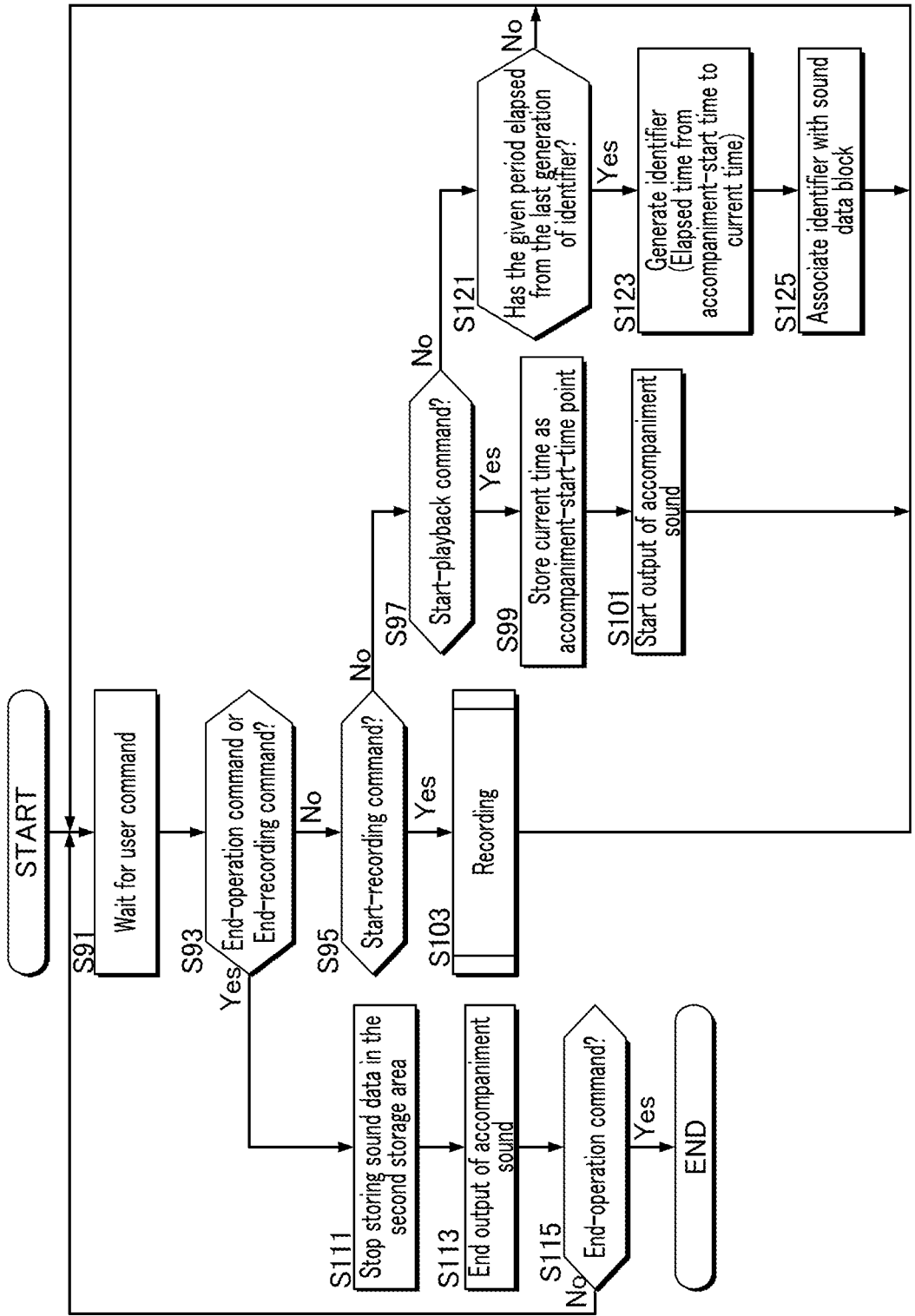
FIG. 14 is a flowchart showing step S43 (recording) shown in FIG. 9 in the second embodiment.

FIG. 14 is a flowchart showing step S43 (recording) shown in FIG. 9 in the second embodiment. The steps S91, S93, S95, S97, S99, S101, S103, S111, S113, and S115 shown in FIG. 14 are identical to those shown in FIG. 9, and therefore, description thereof will be omitted.

If the start-playback command is not received yet (S97: No), the first processor 13a determines whether the given period has elapsed from the last generation of the identifier SD (S121). If positive (Yes) in step S121, the generator 133a generates the identifier SD indicative of the elapsed time from the accompaniment-start-time point to the current time (S123). Next, the generator 133a associates the identifier SD with a sound data block $D_{IN}$ (S125). In more detail, the generator 133a adds in the identifier SD the number of samples of the current sound data blocks $D_{IN}$. In other words, the current sound data block $D_{IN}$ is the sound data block $D_{IN}$ indicated by the write pointer of the second storage area 162.

After the end of step S115, or in a case of negative (No) in step S21, the first processor 13a executes step S91 again.

In the foregoing description, in the second embodiment, the first transmission section 137a associates an identifier SD with each sound data block $D_{IN}$. Each identifier SD indicates the elapsed time from the accompaniment-start-time point to the time point corresponding to the sound data block $D_{IN}$ corresponding to the identifier. This allows the computing device 8 to accurately synchronize the time-series accompaniment data $D_{AC}$ with the time-series sound data $D_{IN}$.

Furthermore, the computing device 8 can easily detect a sound data block $D_{IN}$ that corresponds to an arbitrary time by using a plurality of identifiers SD. In the first embodiment, in a case of detecting the sound data block $D_{IN}$ corresponding to the time t, the computing device 8 is required to search for a sound data block $D_{IN}$ located at $(t \times SP_{IN})$ th from the sound data block $D_{IN}[1]$ ("$SP_{IN}$" represents the sampling frequency). In contrast, in the second embodiment, it is sufficient to search for a sound data block $D_{IN}$ from the sound data block $D_{IN}$ corresponding to the identifier SD of which the elapsed time is closest to the time t from among the plurality of identifiers SD. The sound data block $D_{IN}$ corresponding to any time can be easily detected as compared with the first embodiment.

Third Embodiment

The third embodiment relates to multi-take recording mode. In the multi-take recording mode, the user's performance sound is repeatedly recorded for a plurality of times (the number of takes defined by the user). Specifically, the output signal $S_{OUT}$ is repeatedly output from the output port 151 to the headphone set HP for the number of takes. The time-series sound data $D_{IN}$ from the microphone MC is stored in the second storage area 162 for each time the output signal $S_{OUT}$ is output. The same reference signs will be used for the same components or function in the third embodiment.

Figure 15:
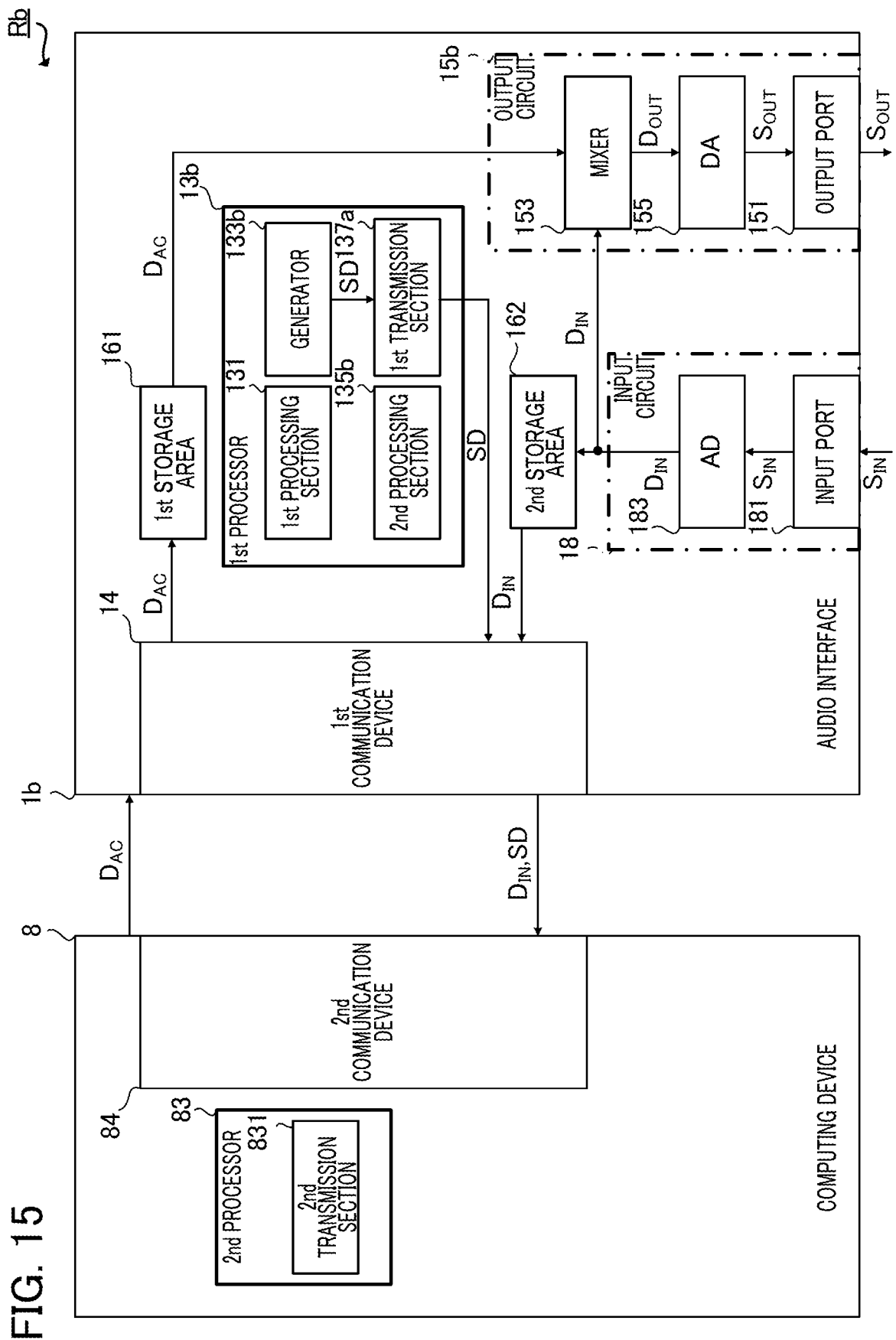
FIG. 15 shows the function of the recording system Rb in the third embodiment.

FIG. 15 shows the function of the recording system Rb in the third embodiment. The audio interface apparatus 1b in the third embodiment includes an operation panel 11, a first processor 13b, a first communication device 14, an output circuit 15b, a first memory 16, and an input circuit 18. The first processor 13b acts as a first processing section 131, a generator 133b, a second processing section 135b, and a first transmission section 137a, by executing a program.

The first processor 13b outputs the time-series accompaniment data $D_{AC}$ stored in the first storage area 161 to the output circuit 15b for the number of takes specified by the user. The output circuit 15b outputs an output signal $S_{OUT}$ based on the time-series accompaniment data $D_{AC}$ to the headphone set HP for the number of takes. In this embodiment, if the computing device 8 detects the user's command for the multi-take recording mode, the computing device 8 transmits the detection result to the audio interface apparatus 1b. The audio interface apparatus 1b repeats output of the output signal $S_{OUT}$ based on the time-series accompaniment data $D_{AC}$ stored in the first storage area 161 unless the audio interface apparatus 1b receives the end-recording command. The audio interface apparatus 1b may directly receive a command for the multi-take recording mode.

The second processing section 135b stores the time-series sound data $D_{IN}$ from the microphone MC in the second storage area 162 for each take.

At time at which a portion of the output signal $S_{OUT}$ corresponding to the head of the time-series accompaniment data $D_{AC}$ is output, the generator 133b generates, for each take, an identifier SD corresponding to a sound data block $D_{IN}$ based on sound received by the microphone MC.

Figure 16:
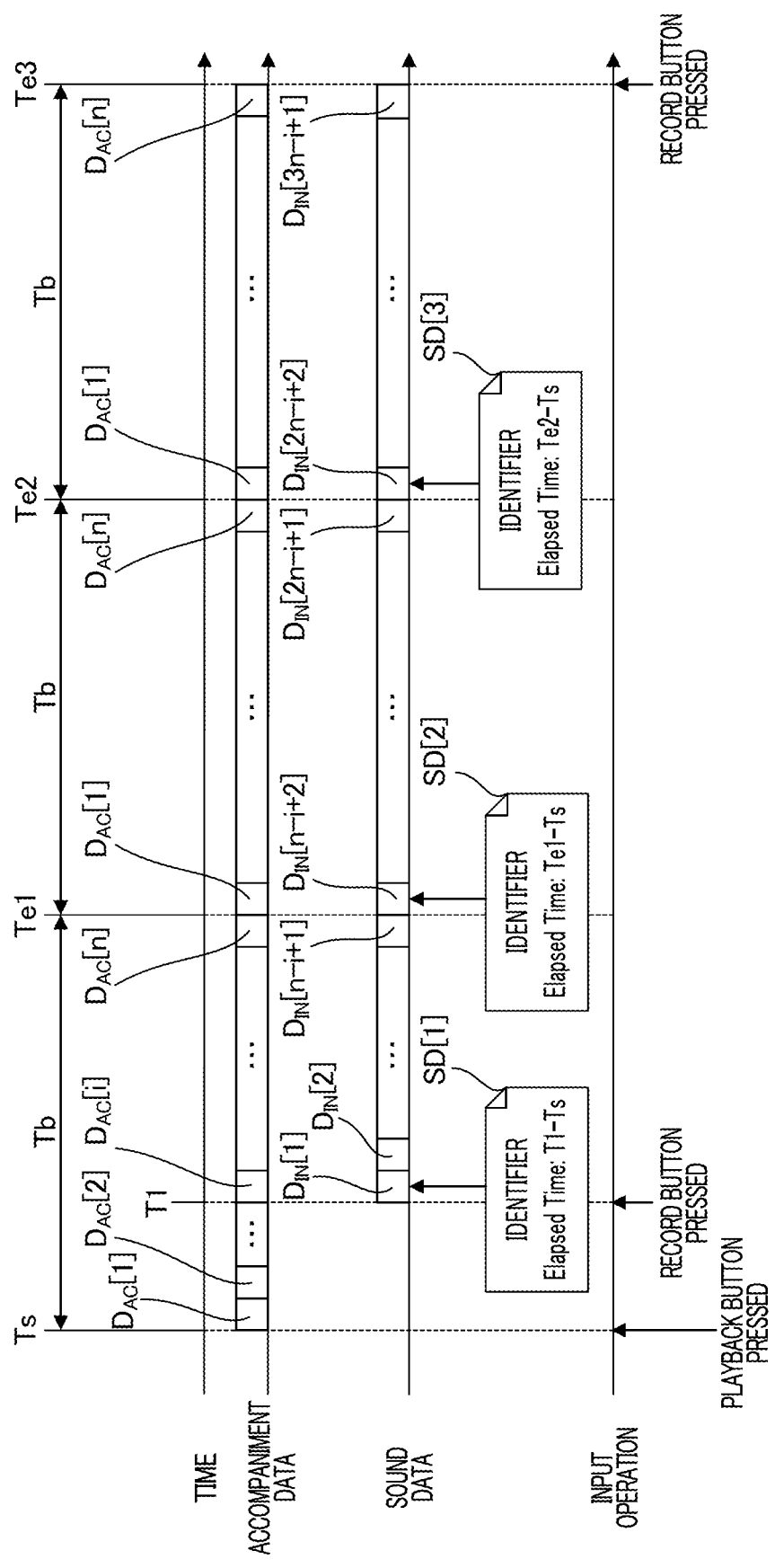
FIG. 16 shows an example of how an identifier SD is generated in multi-take recording mode.

FIG. 16 shows an example of how an identifier SD is generated in multi-take recording mode. In FIG. 16, an example case will be described in which time-series accompaniment data $D_{AC}$ (accompaniment data blocks $D_{AC}[1]$ to $D_{DAC}[n]$) is output three times. In the example shown in FIG. 16, the record button 113 is pressed after the press of the playback button 111. In the following description, the kth output of the time-series accompaniment data $D_{AC}$ is simply referred to as "take k." The "k" is an integer greater than or equal to 1. In the example shown in FIG. 16, the period for playback of the accompaniment data blocks $D_{AC}[1]$ to $D_{AC}[n]$ is the period Tb.

In the illustration in FIG. 16, the playback button 111 is pressed at time Ts, and the record button 113 is pressed at time T1 (>Ts). At time Te1 (>T1), take 1 ends, and take 2 starts. At time Te2 (>Te1), take 2 ends, and take 3 starts. Then, at time Te3 (>Te2), take 3 ends.

The generator 133b generates an identifier SD[1] at time T1, an identifier SD[2] at time Te1, and an identifier SD[3] at time Te2. The identifier SD[1] corresponds to a sound data block $D_{IN}[1]$.

The identifier SD[2] corresponds to a sound data block $D_{IN}[n-i+2]$. The accompaniment data block played at time Te1 is $D_{AC}[1]$. The identifier SD [2] indicates the elapsed time Te1 defined by the period from time Ts to time Te1.

The identifier SD [3] corresponds to a sound data block $D_{IN}[2n-i+2]$. The accompaniment data block played at time Te2 is $D_{AC}[1]$. The identifier SD [3] indicates the elapsed time Te2-Ts defined by the period from time Ts to time Te2.

If the computing device 8 receives an identifier SD, the computing device 8 calculates the number of takes according to the formula (7) below. In addition, the computing device 8 calculates an accompaniment data block $D_{AC}[y]$ that is synchronized with the sound data block $D_{IN}$ associated with the identifier SD according to the formula (8) below.

The number of takes=quotient(elapsed time included in the identifier $SD, Tb$)+1    (7)

$y$=mod(elapsed time contained in the identifier $SD, tb$)×$SP_{AC}$+1    (8)

The "quotient (a1, a2)" indicates the integer part of the quotient when a1 is divided by a2. The "mod (a1, a2)" indicates the remainder when a1 is divided by a2.

In the third embodiment, the identifier SD may include the number of takes. In this case, the computing device 8 may identify, from the number of takes included in the identifier SD, the number of takes of the sound data block $D_{IN}$ associated with the identifier SD.

Figure 17:
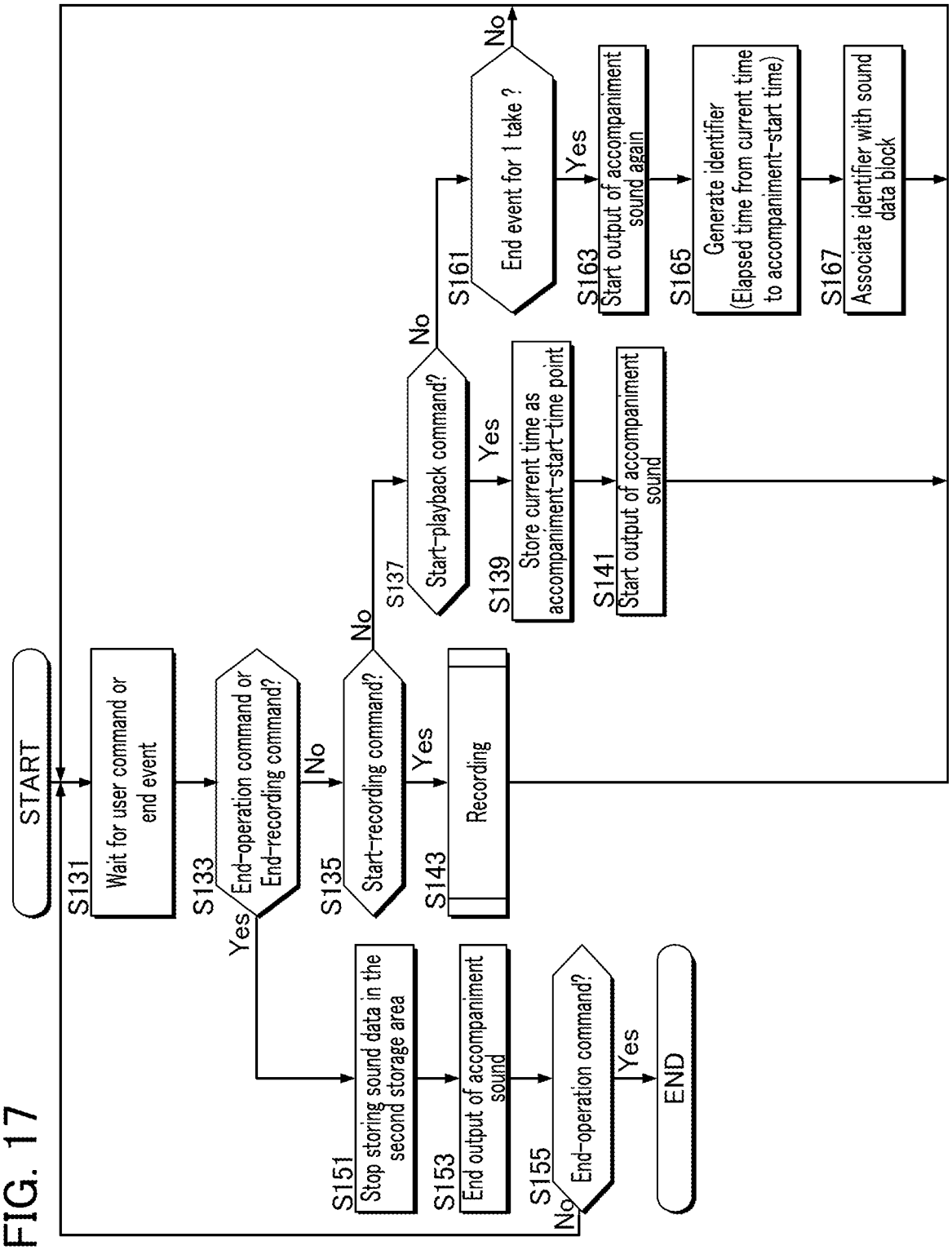
FIG. 17 is a flowchart showing step S43 (recording) shown in the third embodiment.

FIG. 17 is a flowchart showing step S43 (recording) shown in the third embodiment. The steps S133, S135, S137, S139, S141, S143, S151, S153, S155, S165, and S167 shown in FIG. 17 are identical to those shown in FIG. 14, and therefore, description will be omitted.

In step S131, the first processor 13b waits for a user command or an end event for a certain period of time. The end event occurs when one output of the time-series accompaniment data $D_{AC}$ (the accompaniment data blocks $D_{AC}[1]$ to $D_{AC}[n]$) has been made.

If the user command or the end event is received, the first processor 13b executes step S133. The first processor 13b also executes step S133 if nothing is received for the certain time.

If the start-playback command is not received yet (S137: No), the first processor 13b determines in step S161 whether the end event is received. If the end event is received (S161: Yes), the first processor 13b outputs the time-series accompaniment data $D_{AC}$ stored in the first storage area 161 to the output circuit 15b for the number of takes. Then, in step S163, the output circuit 15b starts again an output of the output signal $S_{OUT}$ based on the time-series accompaniment data $D_{AC}$ to the headphone set HP. Next, the generator 133b executes step S165.

If no end event is received (S161: No), the first processor 13b executes step S131 again.

In the foregoing description, in the third embodiment, the first processor 13b outputs the time-series accompaniment data $D_{AC}$ stored in the first storage area 161 to the output circuit 15b for the number of takes. The output circuit 15b outputs an output signal $S_{OUT}$ based on the time-series accompaniment data $D_{AC}$ to the headphone set HP for the number of takes. Accordingly, the computing device 8 only needs to transmit the time-series accompaniment data $D_{AC}$ once in the multi-take recording mode, thereby reducing the amount of communication between the computing device 8 and the audio interface apparatus 1.

In the third embodiment, the second processing section 135b stores the time-series sound data $D_{IN}$ based on the user's performance sound received by the microphone MC in the second storage area 162, for each take, that is, for each time the time-series accompaniment data $D_{AC}$ is output to the output circuit 15b. This allows for the user to compare the sounds for each take.

Modifications

The following are examples of specific modifications that can be added to each of the foregoing embodiments. Two or more modifications freely selected from the following examples may be incorporated as appropriate as long as they do not conflict with each other.

(1) In the first embodiment, the generator 133 generates the identifier SD according to the first mode or the identifier SD according to the second mode in accordance with the input operation of the playback button 111 and the record button 113. However, this is not limited thereto. For example, if only the record button 113 is pressed, the generator 133 may generate an identifier SD that indicates (i) the elapsed time from the accompaniment-start-time point to the performance-start-time point, and (ii) "0" indicative of the above (i).

(2) In each of the foregoing embodiments, the first communication device 14 is connected to the second communication device 84 by wireless connection. They may be connected to each other by wired connection (e.g., Local Area Network (LAN) and the Internet). Even with a wired connection, connection may be unstable if accesses are concentrated on a relay device on the route from the first communication device 14 to the second communication device 84. Accordingly, even in a wired connection, the foregoing effect is effective in which the computing device 8 can accurately synchronize the time-series accompaniment data $D_{AC}$ with the time-series sound data $D_{IN}$.

(3) In each of the foregoing embodiments, each of the first storage area 161 and the second storage area 162 may be an independent memory. In other words, two memories may be provided.

(4) A Musical Instrument Digital Interface (MIDI) instrument that outputs digital sound signals may be connected to the input port 181 instead of the microphone MC. In this case, the input circuit 18 is not required to include the AD converter 183. The input circuit 18 may have two input ports, one of which is for an input device that outputs an analog sound signal, and the other of which is for an input device that outputs a digital sound signal.

(5) The mixer is not essential. The mixer 153 may mix the analog sound signal $S_{IN}$ with the analog time-series accompaniment data $D_{AC}$.

(6) In each of the foregoing embodiments, an example of the first part is an accompaniment part, and an example of the second part is a performance part. The first part may be the performance part, and the second part may be the accompaniment part.

In each of the foregoing embodiments, the start-playback command, the end-playback command, the start-recording command and the end-recording command are generated by the user's input operations, such as the press of the playback button 111 and the record button 113, which are included in the audio interface apparatus 1. These commands may be generated by the input operation to the computing device 8. For example, the display 88 may display the play button and the record button. If the playback button displayed on the display 88 is selected during playback of the output signal $S_{OUT}$ is stopped, the computing device 8 transmits the start-playback command to the audio interface apparatus 1. In addition, the audio interface apparatus 1 may display the reception of the start-playback command transmitted from the computing device 8. For example, the playback button 111 may be configured to emit to notify the user of the reception of the start-playback command. Similarly, the record button 113 may be configured to emit light to notify the user of the reception of the start-recording command transmitted from the computing device 8.

(8) The first processing section 131, the generator 133, the second processing section 135, and the first transmission section 137 are realized by the cooperation of the programs stored in the first processor 13 and the first memory 16 as described above. Although the programs according to the present disclosure are stored in a recordable and computer-readable medium, these programs can be provided in such a medium, and can be installed in the computer.

Examples of the recording medium include a non-transitory recording medium, and an optical recording medium (e.g., a CD-ROM and an optical disc). The recording medium may be any known recording medium, such as a semiconductor recording medium or a magnetic recording medium. Examples of a non-transitory recording media include any recording media other than transitory, propagating signals. A volatile recording media is not excluded.

(9) From the foregoing examples, the following configurations will be clear. An audio interface apparatus according to an aspect (Aspect 1) includes a communication apparatus configured to receive first time-series sound data from a computing device, the first time-series sound data representing sound of a first part of a piece of music and including a plurality of first data blocks obtained by sampling the sound of the first part; an input circuit including an input port configured to be coupled with a sound input apparatus; an output circuit including an output port configured to be coupled with a sound output apparatus; one or more memories; and a processor configured to implement instructions stored in the one or more memories, in which: the processor implements the instructions stored in the one or more memories to: store, in the one or more memories, the first time-series sound data received by the communication apparatus, output, to the output circuit, the first time-series sound data stored in the one or more memories, acquire second time-series sound data from the input circuit, the second time-series sound data representing sound of a second part of the piece of music received by the sound input apparatus and including a plurality of second data blocks obtained by sampling the second time-series sound data, store, in the one or more memories, the second time-series sound data, generate an identifier for synchronizing the second time-series sound data with the first time-series sound data, and transmit, to the computing device, the second time-series sound data and the identifier.

According to the aspect, the second time-series sound data is temporarily stored in the memory, and then is transmitted to the computing device together with the identifier. This allows the computing device to synchronize, by use of the identifier, the first time-series sound data with the second time-series sound data, even if the transmission of the first time-series sound data is delayed in relation to the second time-series sound data due to unstable connection between the audio interface apparatus and the computing device. As a result, temporal interruption of sound represented by the second time-series sound data is reduced.

In one example, Aspect 2, of Aspect 1, the second time-series sound data and the identifier are transmitted to the computing device via a wireless connection.

According to this aspect, even if the transmission of the second time-series sound data is delayed due to the wireless connection, sound represented by the second time-series sound data is reduced. Furthermore, the computing device can accurately synchronize the first time-series sound data with the second time-series sound data.

In one example, Aspect 3, of Aspect 1 or 2, the plurality of first data blocks includes a first head data block that is positioned at a head of the first time-series sound data, the plurality of second data blocks includes a second head data block that is positioned at a head of the second time-series sound data, and the identifier indicates that a first time point on a time series that corresponds to the first head data block is identical to a second time point on the time series that corresponds to the second head data block.

According to the aspect, the computing device can align the head of the first time-series sound data with the head of the second time-series sound data by use of the identifier. This allows for accurate synchronization between the first time-series sound data and the second time-series sound data.

In one example, Aspect 4, of any one of Aspects 1 to 3, the plurality of first data blocks includes a first head data block that is positioned at a head of the first time-series sound data, the plurality of second data blocks includes a second head data block that is positioned at a head of the second time-series sound data, and the identifier indicates an elapsed time from a first time point on a time series that corresponds to the first head data block to a second time point on the time series that corresponds to the second head data block.

According to this aspect, the computing device can align the head of the first time-series sound data with the head of the second time-series sound data by use of the identifier. This allows for accurate synchronization between the first time-series sound data and the second time-series sound data.

In one example, Aspect 5, of any one of Aspects 1 to 4, the plurality of first data blocks includes a first head data block that is positioned at a head of the first time-series sound data, the processor implements the instructions stored in the one or more memories to associate each of the plurality of second data blocks with the identifier, and the identifier associated with each of the plurality of second data blocks indicates an elapsed time from a first time point on a time series that corresponds to the first head data block to a second time point on the time series that corresponds to a second data block corresponding to the identifier.

According to this aspect, the computing device can align the first sound data block with each second sound data block, with reference to each identifier.

This allows for accurate synchronization between the first time-series sound data and the second time-series sound data.

In one example, Aspect 6, of any one of Aspects 1 to 5, the output circuit further includes a mixer configured to mix the first time-series sound data with the second time-series sound data.

The aspect allows for the user to listen to sound produced by mixing the first time-series sound data with the second time-series sound data.

In one example, Aspect 7, of any one of Aspects 1 to 6, the processor implements the instructions stored in the one or more memories to output, to the output circuit for a plurality of times, the first time-series sound data stored in the one or more memories.

According to this aspect, the computing device only needs to transmit the first time-series sound data once in the multi-take recording mode for output of the first time-series sound data for a plurality of times, thereby reducing the amount of communication between the computing device and the audio interface apparatus.

In one example, Aspect 8, of Aspect 7, the processor implements the instructions stored in the one or more memories to store the second time-series sound data in the one or more memories each time the first time-series sound data is output.

The aspect allows the user to compare the sounds for each take.

A recording system according to one aspect, Aspect 9, includes an audio interface apparatus; and a computing device including first time-series sound data, in which the audio interface apparatus includes: a communication apparatus configured to receive the first time-series sound data from the computing device, the first time-series sound data representing sound of a first part of a piece of music and including a plurality of first data blocks obtained by sampling the sound of the first part; an input circuit including an input port configured to be coupled with a sound input apparatus; an output circuit including an output port configured to be coupled with a sound output apparatus; one or more memories; and a first processor configured to implement instructions stored in the one or more memories, in which: the first processor implements the instructions stored in the one or more memories to: store, in the one or more memories, the first time-series sound data received by the communication apparatus, output, to the output circuit, the first time-series sound data stored in the one or more memories, acquire second time-series sound data from the input circuit, the second time-series sound data representing sound of a second part of the piece of music received by the sound input apparatus and including a plurality of second data blocks obtained by sampling the second time-series sound data, store, in the one or more memories, the second time-series sound data, generate an identifier for synchronizing the second time-series sound data with the first time-series sound data, and transmit, to the computing device, the second time-series sound data and the identifier.

This aspect allows the computing device to synchronize, by use of the identifier, to the first time-series sound data with the second time-series sound data. As a result, temporal interruption of sound represented by the second time-series sound data is reduced.

In one example, Aspect 10, of Aspect 9, the computing device includes one or more memories configured to store the first time-series sound data; and a second processor, and the second processor is configured to transmit, to the audio interface apparatus, from among the plurality of first data blocks included in the first time-series sound data stored in the one or more memories of the computing device, a plurality of first data blocks that corresponds to a period from a start time point of playback of the sound of the first part to a given period.

According to this aspect, the audio interface apparatus can play back sound of the first part immediately after receiving an instruction for playback, without being affected by the wireless connection state.

In one example, Aspect 11, of Aspect 9, the first part includes a plurality of parts, and the first time-series sound data is data obtained by mixing sounds of the plurality of parts.

This aspect can be applied to the first part including a plurality of parts.

DESCRIPTION OF REFERENCE SIGNS 1, 1a, 1b . . . audio interface apparatus;
8 . . . computing device;
13, 13a, 13b . . . first processor;
15, 15b . . . output circuit;
83 . . . second processor;
88 . . . display;
131 . . . first processing section;
133, 133a, 133b . . . generator;
135, 135b . . . second processing section;
137, 137a . . . first transmission section;
151 . . . output port;
153 . . . mixer;
181 . . . input port;
$D_{AC}$ . . . time-series accompaniment data;
$D_{IN}$ . . . time-series sound data;
R, Ra, Rb . . . data;
R, Ra, Rb . . . recording system;
SD . . . identifier.

What is claimed is:

1. An audio interface apparatus comprising:
a communication apparatus configured to receive first time-series sound data from a computing device, the first time-series sound data representing sound of a first part of a piece of music and including a plurality of first data blocks obtained by sampling the sound of the first part;
an input circuit including an input port configured to be coupled with a sound input apparatus;
an output circuit including an output port configured to be coupled with a sound output apparatus;
one or more memories; and
a processor configured to implement instructions stored in the one or more memories, wherein:
the processor implements the instructions stored in the one or more memories to:
store, in the one or more memories, the first time-series sound data received by the communication apparatus,
output, to the output circuit, the first time-series sound data stored in the one or more memories,
acquire second time-series sound data from the input circuit, the second time-series sound data representing sound of a second part of the piece of music received by the sound input apparatus and including a plurality of second data blocks obtained by sampling the second time-series sound data,
store, in the one or more memories, the second time-series sound data,
generate an identifier for synchronizing the second time-series sound data with the first time-series sound data, and
transmit, to the computing device, the second time-series sound data and the identifier.

2. The audio interface apparatus according to claim 1, wherein the second time-series sound data and the identifier are transmitted to the computing device via a wireless connection.

3. The audio interface apparatus according to claim 1, wherein:
the plurality of first data blocks includes a first head data block that is positioned at a head of the first time-series sound data,
the plurality of second data blocks includes a second head data block that is positioned at a head of the second time-series sound data, and
the identifier indicates that a first time point on a time series that corresponds to the first head data block is identical to a second time point on the time series that corresponds to the second head data block.

4. The audio interface apparatus according to claim 1, wherein:
the plurality of first data blocks includes a first head data block that is positioned at a head of the first time-series sound data,
the plurality of second data blocks includes a second head data block that is positioned at a head of the second time-series sound data, and
the identifier indicates an elapsed time from a first time point on a time series that corresponds to the first head data block to a second time point on the time series that corresponds to the second head data block.

5. The audio interface apparatus according to claim 1, wherein:
the plurality of first data blocks includes a first head data block that is positioned at a head of the first time-series sound data,
the processor implements the instructions stored in the one or more memories to associate each of the plurality of second data blocks with the identifier, and
the identifier associated with each of the plurality of second data blocks indicates an elapsed time from a first time point on a time series that corresponds to the first head data block to a second time point on the time series that corresponds to a second data block corresponding to the identifier.

6. The audio interface apparatus according to claim 1, wherein the output circuit further includes a mixer configured to mix the first time-series sound data with the second time-series sound data.

7. The audio interface apparatus according to claim 1, wherein the processor implements the instructions stored in the one or more memories to output, to the output circuit for a plurality of times, the first time-series sound data stored in the one or more memories.

8. The audio interface apparatus according to claim 1, wherein the processor implements the instructions stored in the one or more memories to store the second time-series sound data in the one or more memories each time the first time-series sound data is output.

9. A recording system comprising:
an audio interface apparatus; and
a computing device including first time-series sound data, wherein the audio interface apparatus includes:
a communication apparatus configured to receive the first time-series sound data from the computing device, the first time-series sound data representing sound of a first part of a piece of music and including a plurality of first data blocks obtained by sampling the sound of the first part;
an input circuit including an input port configured to be coupled with a sound input apparatus;
an output circuit including an output port configured to be coupled with a sound output apparatus;
one or more memories; and
a first processor configured to implement instructions stored in the one or more memories, wherein:
the first processor implements the instructions stored in the one or more memories to:
store, in the one or more memories, the first time-series sound data received by the communication apparatus,
output, to the output circuit, the first time-series sound data stored in the one or more memories,
acquire second time-series sound data from the input circuit, the second time-series sound data representing sound of a second part of the piece of music received by the sound input apparatus and including a plurality of second data blocks obtained by sampling the second time-series sound data,
store, in the one or more memories, the second time-series sound data,
generate an identifier for synchronizing the second time-series sound data with the first time-series sound data, and
transmit, to the computing device, the second time-series sound data and the identifier.

10. The recording system according to claim 9, wherein:
the computing device includes:
one or more memories configured to store the first time-series sound data; and
a second processor, and
the second processor is configured to transmit, to the audio interface apparatus, from among the plurality of first data blocks included in the first time-series sound data stored in the one or more memories of the computing device, a plurality of first data blocks that corresponds to a period from a start time point of playback of the sound of the first part to a given period.

11. The recording system according to claim 9, wherein:
the first part includes a plurality of parts, and
the first time-series sound data is obtained by mixing sounds of the plurality of parts.

* * * * *